US012741489B2

(12) United States Patent
Endo

(10) Patent No.: US 12,741,489 B2

(45) Date of Patent: Sep. 22, 2026

(54) TIRE

(71) Applicant: The Yokohama Rubber Co., LTD., Tokyo (JP)

(72) Inventor: Hiroki Endo, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 80 days.

(21) Appl. No.: 18/067,243

(22) Filed: Dec. 16, 2022

(65) Prior Publication Data

US 2023/0191850 A1 Jun. 22, 2023

(30) Foreign Application Priority Data

Dec. 21, 2021 (JP) ................................ 2021-206748
Aug. 4, 2022 (JP) ................................ 2022-124612

(51) Int. Cl.

| | |
|---|---|
| ***B60C 11/03*** | (2006.01) |
| ***B60C 11/01*** | (2006.01) |
| ***B60C 11/11*** | (2006.01) |
| ***B60C 11/12*** | (2006.01) |

(52) U.S. Cl.

CPC .......... *B60C 11/0309* (2013.01); *B60C 11/01* (2013.01); *B60C 11/11* (2013.01); *B60C 2011/036* (2013.01); *B60C 2011/0365* (2013.01); *B60C 2011/0367* (2013.01); *B60C 2011/0381* (2013.01); *B60C 11/1204* (2013.01); *B60C 2011/1213* (2013.01);

(Continued)

(58) Field of Classification Search

CPC ... B60C 11/01; B60C 2011/013; B60C 11/11; B60C 11/0306; B60C 11/0309; B60C 11/1307; B60C 11/1323; B60C 2011/1338; B60C 11/1384; B60C 11/1392

See application file for complete search history.

(56) References Cited

U.S. PATENT DOCUMENTS 6,003,575 A * 12/1999 Koyama ................ B60C 11/12 152/209.27
6,761,198 B2 7/2004 Zanzig et al.
11,135,878 B2 10/2021 Sueyoshi (Continued)

FOREIGN PATENT DOCUMENTS

CN 113799548 A * 12/2021 ......... B60C 11/1353
DE 10 2019 200 901 A1 7/2020

(Continued)

*Primary Examiner* — Katelyn W Smith

*Assistant Examiner* — Thomas Frank Schneider

(74) *Attorney, Agent, or Firm* — Thorpe North & Western, LLP

(57) ABSTRACT

A tire includes a plurality of circumferential main grooves extending in a tire circumferential direction, and a pair of shoulder land portions and one or more rows of center land portions defined by the plurality of circumferential main grooves. Further, at least one of the pair of shoulder land portions includes a plurality of shoulder lug grooves and a plurality of shoulder blocks defined and formed by the plurality of shoulder lug grooves. Additionally, at least a part of the plurality of shoulder blocks includes a notch portion that connects edge portions separated from a tire ground contact edge and a buttress portion. Additionally, the notch portion has a step-shaped wall surface in a cross-sectional view in a tire meridian direction.

12 Claims, 17 Drawing Sheets

(52) U.S. Cl.
CPC ... *B60C 11/1236* (2013.01); *B60C 2011/1254* (2013.01); *B60C 2200/14* (2013.01)

(56) References Cited

U.S. PATENT DOCUMENTS

| | | | | |
|---|---|---|---|---|
| 11,142,024 | B2 | 10/2021 | Kageyama et al. | |
| 11,633,987 | B2 | 4/2023 | Yukami | |
| 2003/0041939 | A1 | 3/2003 | Allison et al. | |
| 2009/0107600 | A1 * | 4/2009 | Missik-Gaffney | B60C 11/01 152/209.16 |
| 2009/0194242 | A1 | 8/2009 | Liang et al. | |
| 2010/0147426 | A1 * | 6/2010 | Janesh | B60C 11/11 152/209.24 |
| 2017/0120691 | A1 * | 5/2017 | Arai | B60C 11/0306 |
| 2017/0305203 | A1 * | 10/2017 | Kreitzman | B60C 13/02 |
| 2018/0207989 | A1 * | 7/2018 | Sueyoshi | B60C 11/11 |
| 2019/0016179 | A1 * | 1/2019 | Yamakawa | B60C 11/01 |
| 2020/0406686 | A1 * | 12/2020 | Yoshida | B60C 11/1369 |
| 2021/0155054 | A1 * | 5/2021 | Yukami | B60C 11/11 |

FOREIGN PATENT DOCUMENTS

| | | | | |
|---|---|---|---|---|
| EP | 1992503 | A1 * | 11/2008 | B60C 11/0304 |
| EP | 3549788 | A1 | 10/2019 | |
| JP | H6-24211 | | 2/1994 | |
| JP | H11291718 | A | 10/1999 | |
| JP | 2001-55014 | A | 2/2001 | |
| JP | 2015-202777 | A | 11/2015 | |
| JP | 2016-74275 | A | 5/2016 | |
| JP | 2017-121876 | A | 7/2017 | |
| JP | 2018-052202 | A | 4/2018 | |
| JP | 2018-118604 | A | 8/2018 | |
| JP | 2019-182067 | | 10/2019 | |
| JP | 2021-003948 | A | 1/2021 | |
| JP | 2021-84450 | | 6/2021 | |
| WO | WO 2015/146823 | A1 | 10/2015 | |
| WO | WO 2017/122742 | A1 | 7/2017 | |

* cited by examiner

| | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|---|---|---|---|---|
| SEPARATION OF SECOND BRANCH PORTION | NO | YES | YES | YES | YES | YES | YES | YES | YES | YES | YES | YES | YES |
| D2/W12 | 0 | 0.05 | 0.15 | 0.30 | 0.15 | 0.15 | 0.15 | 0.15 | 0.15 | 0.15 | 0.15 | 0.15 | 0.15 |
| W13/W11 | 0.13 | 0.13 | 0.13 | 0.13 | 0.07 | 0.30 | 0.46 | 0.30 | 0.30 | 0.30 | 0.30 | 0.30 | 0.30 |
| L13/W12A | 0.38 | 0.38 | 0.38 | 0.38 | 0.38 | 0.38 | 0.38 | 0.45 | 0.60 | 0.76 | 0.60 | 0.60 | 0.60 |
| Le1/L12 | 0.35 | 0.36 | 0.36 | 0.36 | 0.36 | 0.36 | 0.36 | 0.36 | 0.36 | 0.36 | 0.22 | 0.40 | 0.54 |
| W13/Le1 | 0.20 | 0.20 | 0.20 | 0.20 | 0.20 | 0.20 | 0.20 | 0.20 | 0.20 | 0.20 | 0.20 | 0.20 | 0.20 |
| Le2/Le1 | 1.00 | 1.00 | 1.00 | 1.00 | 1.00 | 1.00 | 1.00 | 1.00 | 1.00 | 1.00 | 1.00 | 1.00 | 1.00 |
| WIDENED PORTION OF SECOND BRANCH PORTION | NO | NO | NO | NO | NO | NO | NO | NO | NO | NO | NO | NO | NO |
| (Le2 - Le2')/L12 | 0 | 0 | 0 | 0 | 0 | 0 | 0 | 0 | 0 | 0 | 0 | 0 | 0 |
| SRc/(D2×H11) | 0 | 0.45 | 0.45 | 0.45 | 0.45 | 0.45 | 0.45 | 0.45 | 0.45 | 0.45 | 0.45 | 0.45 | 0.45 |
| Hc/H11 | 0 | 1.00 | 1.00 | 1.00 | 1.00 | 1.00 | 1.00 | 1.00 | 1.00 | 1.00 | 1.00 | 1.00 | 0.92 |
| SNOW TRACTION PERFORMANCE | 100 | 101 | 103 | 105 | 103 | 104 | 104 | 104.5 | 105 | 105 | 105 | 105 | 105 |
| WEAR RESISTANCE PERFORMANCE | 100 | 103 | 102 | 98 | 102.5 | 102 | 101.5 | 102 | 102 | 101 | 102 | 103 | 102 |

FIG. 13

| | EXAMPLE 13 | EXAMPLE 14 | EXAMPLE 15 | EXAMPLE 16 | EXAMPLE 17 | EXAMPLE 18 | EXAMPLE 19 | EXAMPLE 20 | EXAMPLE 21 | EXAMPLE 22 | EXAMPLE 23 | EXAMPLE 24 | EXAMPLE 25 | EXAMPLE 26 | EXAMPLE 27 |
|---|---|---|---|---|---|---|---|---|---|---|---|---|---|---|---|
| SEPARATION OF SECOND BRANCH PORTION | YES | YES | YES | YES | YES | YES | YES | YES | YES | YES | YES | YES | YES | YES | YES |
| D2/W12 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| W13/W11 | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 |
| L13/W12A | 0.60 | 0.60 | 0.60 | 0.60 | 0.60 | 0.60 | 0.60 | 0.60 | 0.60 | 0.60 | 0.60 | 0.60 | 0.60 | 0.60 | 0.60 |
| Le1/L12 | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| W13/Le1 | 0.25 | 0.30 | 0.35 | 0.30 | 0.30 | 0.30 | 0.30 | 0.30 | 0.30 | 0.30 | 0.30 | 0.30 | 0.30 | 0.30 | 0.30 |
| Le2/Le1 | 1.00 | 1.00 | 1.00 | 0.84 | 1.05 | 1.18 | 1.05 | 1.05 | 1.05 | 1.05 | 1.05 | 1.05 | 1.05 | 1.05 | 1.05 |
| WIDENED PORTION OF SECOND BRANCH PORTION | NO | NO | NO | NO | NO | NO | YES | YES | YES | YES | YES | YES | YES | YES | YES |
| (Le2 - Le2')/L12 | 0 | 0 | 0 | 0 | 0 | 0 | 0.04 | 0.10 | 0.20 | 0.10 | 0.10 | 0.10 | 0.10 | 0.10 | 0.10 |
| SRc/(D2×H11) | 0.45 | 0.45 | 0.45 | 0.45 | 0.45 | 0.45 | 0.45 | 0.45 | 0.45 | 0.51 | 0.62 | 0.79 | 0.62 | 0.62 | 0.62 |
| Hc/H11 | 1.00 | 1.00 | 1.00 | 1.00 | 1.00 | 1.00 | 1.00 | 1.00 | 1.00 | 1.00 | 1.00 | 1.00 | 0.92 | 0.80 | 0.62 |
| SNOW TRACTION PERFORMANCE | 105.5 | 106 | 106 | 106 | 106 | 106 | 106.5 | 107 | 107 | 107 | 108 | 108 | 108 | 108 | 107.5 |
| WEAR RESISTANCE PERFORMANCE | 103 | 103 | 102.5 | 103 | 104 | 103 | 104 | 104 | 103 | 104 | 104 | 103.5 | 105 | 106 | 106 |

FIG. 14

| | COMPARATIVE EXAMPLE 2 | EXAMPLE 28 | EXAMPLE 29 | EXAMPLE 30 | EXAMPLE 31 | EXAMPLE 32 | EXAMPLE 33 | EXAMPLE 34 | EXAMPLE 35 |
|---|---|---|---|---|---|---|---|---|---|
| WALL SURFACE SHAPE OF NOTCH PORTION | FIG. 17 | FIG. 11 | FIG. 11 | FIG. 11 | FIG. 11 | FIG. 11 | FIG. 11 | FIG. 11 | FIG. 11 |
| D2/W12A | 0.18 | 0.18 | 0.12 | 0.05 | 0.05 | 0.05 | 0.05 | 0.05 | 0.05 |
| SRc/H11 | 3.56 | 6.54 | 4.36 | 1.65 | 3.58 | 4.40 | 5.50 | 4.52 | 4.66 |
| Hc/H11 | 0.30 | 0.30 | 0.30 | 0.30 | 0.65 | 0.80 | 1.00 | 0.80 | 0.80 |
| Hc'/Hc | - | 0.20 | 0.20 | 0.20 | 0.20 | 0.20 | 0.20 | 0.34 | 0.50 |
| Wc'/D2 | - | 0.40 | 0.40 | 0.40 | 0.40 | 0.40 | 0.40 | 0.40 | 0.40 |
| W13/W11 | 0.13 | 0.13 | 0.13 | 0.13 | 0.13 | 0.13 | 0.13 | 0.13 | 0.13 |
| L13/W12A | 0.42 | 0.42 | 0.42 | 0.42 | 0.42 | 0.42 | 0.42 | 0.42 | 0.42 |
| H13/H11 | 0.15 | 0.15 | 0.15 | 0.15 | 0.15 | 0.15 | 0.15 | 0.15 | 0.15 |
| RAISED BOTTOM PORTION OF SHOULDER NARROW GROOVE | NONE | NONE | NONE | NONE | NONE | NONE | NONE | NONE | NONE |
| SNOW TRACTION PERFORMANCE | 100 | 101 | 101 | 101 | 102 | 103 | 104 | 104 | 105 |
| WEAR RESISTANCE PERFORMANCE | 100 | 100 | 103 | 104 | 104 | 104 | 101 | 104 | 102 |

FIG. 15

| | EXAMPLE 36 | EXAMPLE 37 | EXAMPLE 38 | EXAMPLE 39 | EXAMPLE 40 | EXAMPLE 41 | EXAMPLE 42 | EXAMPLE 43 | EXAMPLE 44 | EXAMPLE 45 | EXAMPLE 46 |
|---|---|---|---|---|---|---|---|---|---|---|---|
| WALL SURFACE SHAPE OF NOTCH PORTION | FIG. 11 | FIG. 11 | FIG. 11 | FIG. 11 | FIG. 11 | FIG. 11 | FIG. 11 | FIG. 11 | FIG. 11 | FIG. 11 | FIG. 11 |
| D2/W12A | 0.05 | 0.05 | 0.05 | 0.05 | 0.05 | 0.05 | 0.05 | 0.05 | 0.05 | 0.05 | 0.05 |
| SRc/H11 | 4.63 | 4.74 | 4.95 | 4.63 | 4.63 | 4.63 | 4.63 | 4.63 | 4.63 | 2.07 | 4.63 |
| Hc/H11 | 0.80 | 0.80 | 0.80 | 0.80 | 0.80 | 0.80 | 0.80 | 0.80 | 0.80 | 0.80 | 0.80 |
| Hc'/Hc | 0.34 | 0.34 | 0.34 | 0.34 | 0.34 | 0.34 | 0.34 | 0.34 | 0.34 | 0.34 | 0.34 |
| Wc'/D2 | 0.55 | 0.70 | 1.00 | 0.55 | 0.55 | 0.55 | 0.55 | 0.55 | 0.55 | 0.55 | 0.55 |
| W13/W11 | 0.13 | 0.13 | 0.13 | 0.06 | 0.30 | 0.48 | 0.30 | 0.30 | 0.30 | 0.30 | 0.30 |
| L13/W12A | 0.42 | 0.42 | 0.42 | 0.42 | 0.42 | 0.42 | 0.60 | 0.76 | 0.60 | 0.60 | 0.60 |
| H13/H11 | 0.15 | 0.15 | 0.15 | 0.15 | 0.15 | 0.15 | 0.15 | 0.15 | 0.46 | 0.74 | 0.93 |
| RAISED BOTTOM PORTION OF SHOULDER NARROW GROOVE | NONE | NONE | NONE | NONE | NONE | NONE | NONE | NONE | NONE | YES | NONE |
| SNOW TRACTION PERFORMANCE | 105 | 106 | 106 | 103 | 106 | 107 | 107 | 108 | 108 | 109 | 109 |
| WEAR RESISTANCE PERFORMANCE | 104 | 102 | 101 | 105 | 104 | 103 | 104 | 103 | 104 | 107 | 104 |

FIG. 16

COMPARATIVE EXAMPLE 2

TIRE

RELATED APPLICATION

This application is based upon and claims the benefit of priority from Japanese Patent Application No. 2021-206748, filed Dec. 21, 2021 and Japanese Patent Application No. 2022-124612, filed Aug. 4, 2022, the entire contents of which are incorporated herein by reference.

TECHNICAL FIELD

The technology relates to a tire and particularly relates to a tire that can provide snow performance and wear resistance performance of a tire in a compatible manner.

BACKGROUND ART

In the related art, for a known all-season tire that is mounted on a pickup truck, an SUV (Sport Utility Vehicle), or the like, there is a demand for improving the snow performance or mud performance of the tire. Technology described in Japan Unexamined Patent Publication No. 2015-202777 A is a known tire in the related art associated with such a problem.

SUMMARY

The technology provides a tire that can provide snow performance and wear resistance performance of a tire in a compatible manner.

The tire according to an embodiment of the technology is a tire including a plurality of circumferential main grooves extending in a tire circumferential direction, and a pair of shoulder land portions and one or more rows of center land portions defined by the plurality of circumferential main grooves, at least one of the pair of shoulder land portions including a plurality of shoulder lug grooves and a plurality of shoulder blocks defined and formed by the plurality of shoulder lug grooves, at least a part of the plurality of shoulder blocks including a notch portion that connects an edge portion separated from a tire ground contact edge and a buttress portion, and the notch portion having a wall surface with a step shape in a cross-sectional view in a tire meridian direction.

In the tire according to an embodiment of the technology, the shoulder block includes a notch portion that connects an edge portion and a buttress portion, and the notch portion has a step-shaped wall surface in a cross-sectional view in the tire meridian direction, and thus there is an advantage that the rigidity of the shoulder block is ensured and the uneven wear resistance performance of the tire is improved, as compared to a configuration in which the notch portion has an L-shaped wall surface. In addition, compared to a configuration in which the edge portion of the shoulder block is directly connected to the buttress portion without including a notch portion, there is an advantage of improving the snow performance of the tire due to the snow discharge effect of the notch portion.

BRIEF DESCRIPTION OF DRAWINGS

FIG. 13 is a table showing the results of performance tests of tires according to embodiments of the technology.

FIG. 14 is a table showing the results of performance tests of tires according to embodiments of the technology.

FIG. 15 is a table showing the results of performance tests of tires according to embodiments of the technology.

FIG. 16 is a table showing the results of performance tests of tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
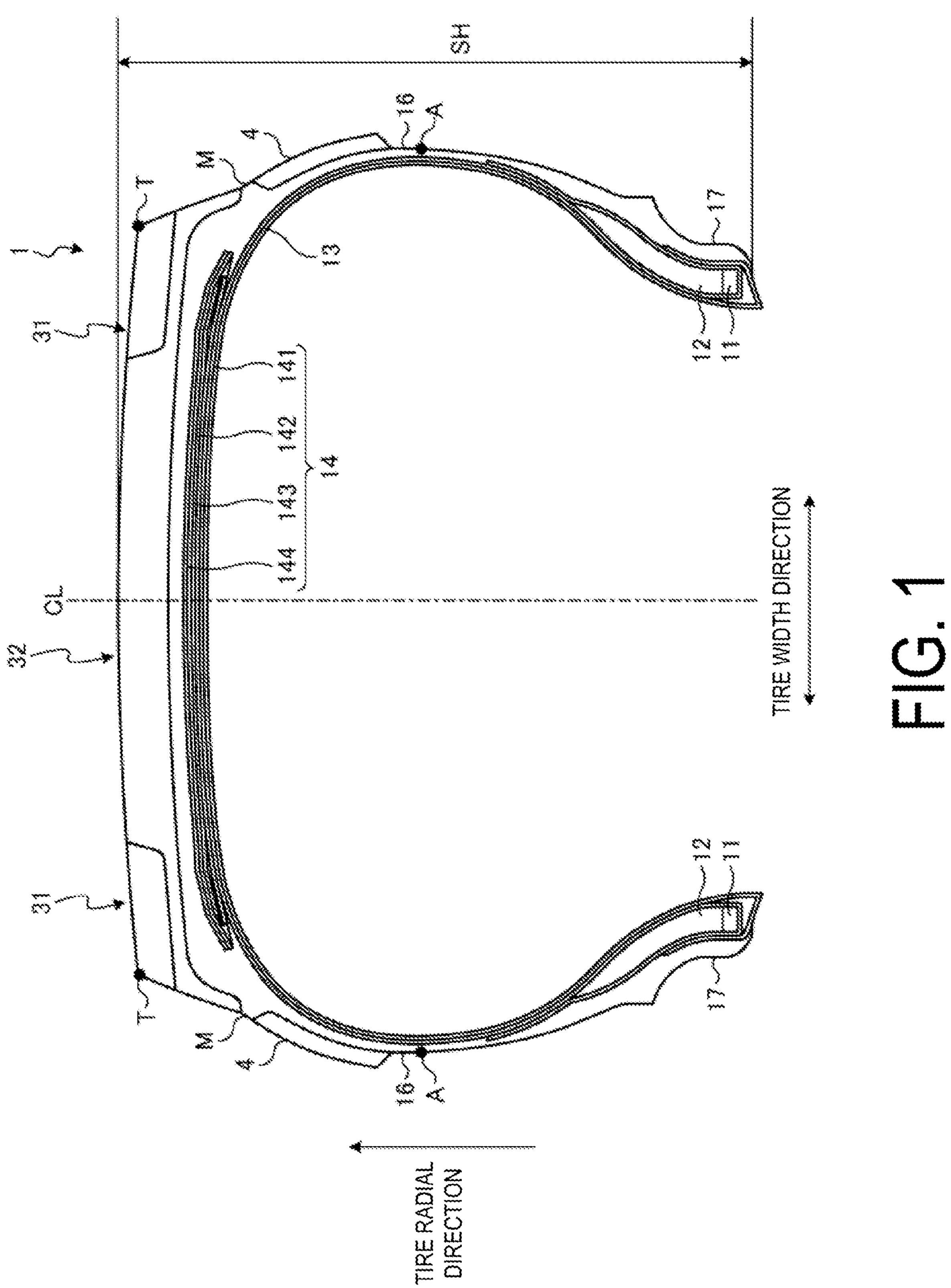
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region in a tire radial direction. Further, the same drawing also illustrates a pneumatic radial tire for a light truck as an example of a tire.

In the same drawing, a cross-section in the tire meridian direction is defined as a cross-section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA (The Japan Automobile Tyre Manufacturers Association, Inc.). Additionally, a tire width direction is defined as a direction parallel to the tire rotation axis, and the tire radial direction is defined as a direction perpendicular to the tire rotation axis.

The tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are respectively disposed on an outer circumference of the pair of bead cores 11, 11 in the tire radial direction and reinforce the bead portions.

The carcass layer 13 has a single layer structure including one carcass ply, or a multilayer structure including a plurality of carcass plies being layered, and the carcass layer 13 extends in a toroidal shape between the bead cores 11, 11 at the left and right, and constitutes the backbone of the tire. Additionally, both end portions of the carcass layer 13 are turned back toward outer sides in the tire width direction to wrap the bead cores 11 and the bead fillers 12, and are fixed. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

The belt layer 14 is made of a plurality of belt plies 141 to 144 being layered and is disposed around an outer circumference of the carcass layer 13. The belt plies 141 to 144 include a pair of cross belts 141, 142 and a plurality of belt covers 143, 144.

The pair of cross belts 141, 142 are made by covering a plurality of belt cords made of steel or an organic fiber material with a coating rubber and performing a rolling process on the belt cords, and have a cord angle of 15 degrees or more and 55 degrees or less as an absolute value. Further, the pair of cross belts 141, 142 have cord angles (defined as inclination angles in longitudinal directions of the belt cords with respect to the tire circumferential direction) of mutually opposite signs and are layered such that the longitudinal directions of the belt cords intersect each other (so-called crossply structure). Furthermore, the pair of cross belts 141, 142 are disposed in a layered manner on an outer side in the tire radial direction of the carcass layer 13.

The belt covers 143, 144 are made by coating belt cover cords made from steel or an organic fiber material with a coating rubber and has a cord angle, as an absolute value, of 0 degrees or more and 10 degrees or less. Additionally, the belt covers 143, 144 are, for example, strip materials formed by coating one or a plurality of belt cover cords with a coating rubber, where the strip material is formed by winding the strip material spirally on the outer circumferential surfaces of the cross belts 141 and 142 multiple times in the tire circumferential direction. Additionally, the plurality of belt covers 143, 144 are disposed covering all the cross belts 141, 142.

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions of left and right, respectively. The pair of rim cushion rubbers 17, 17 extend from an inner side in the tire radial direction of the bead cores 11, 11 of left and right and turned back portions of the carcass layer 13 toward the outer side in the tire width direction, and constitute rim fitting surfaces of the bead portions.

Tread Pattern

Figure 2:
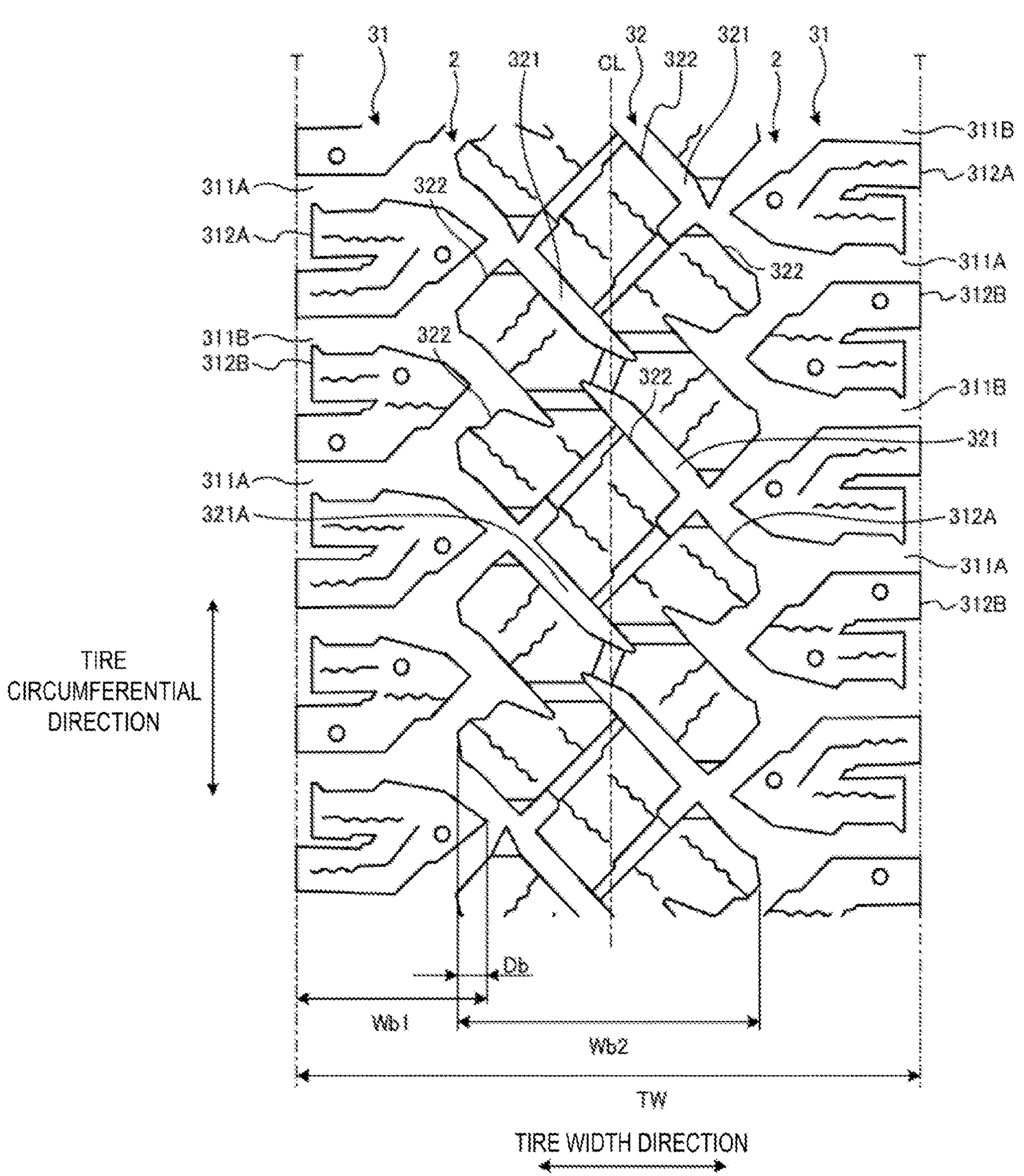
FIG. 2 is a plan view illustrating a tread surface of the tire illustrated in FIG. 1.

FIG. 2 is a plan view illustrating a tread surface of the tire 1 illustrated in FIG. 1. The same drawing illustrates a tread surface of an off-road tire. In the same drawing, "tire circumferential direction" refers to the direction about the tire rotation axis. Additionally, reference sign T denotes a tire ground contact edge, and dimension symbol TW denotes a tire ground contact width.

As illustrated in FIG. 2, the tire 1 includes, in the tread surface, a pair of circumferential main grooves 2, and a pair of shoulder land portions 31 and one center land portion 32 that are defined and formed by these circumferential main grooves 2.

The circumferential main groove 2 has a zigzag shape having an amplitude in the tire width direction. Further, the circumferential main groove 2 refers to a groove on which a wear indicator must be provided as specified by JATMA, and has a maximum groove width of 7.0 mm or more and a maximum groove depth of 8.0 mm or more.

The groove width is measured as the maximum distance between groove walls opposite to each other in a groove opening portion when the tire is mounted on a specified rim, inflated to a specified internal pressure, and in an unloaded state. In a configuration in which the groove opening portion includes a notch portion or a chamfered portion, the groove width is measured with intersection points between an extension line of the tread contact surface and extension lines of the groove walls as measurement points, in a cross-sectional view parallel with the groove width direction and the groove depth direction.

The groove depth is measured as the maximum distance from the tread contact surface to a groove bottom when the tire is mounted on a specified rim, inflated to a specified internal pressure, and in an unloaded state. Additionally, in a configuration in which a groove bottom includes partial recess/protrusion portions or a sipe, the groove depth is measured excluding the partial recess/protrusion portions or the sipe.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in JATMA, in the case of a tire for a passenger vehicle, the specified internal pressure is an air pressure of 180 kPa, and the specified load is 88% of the maximum load capacity at the specified internal pressure.

Additionally, in FIG. 2, a maximum ground contact width Wb1 of the shoulder land portion 31 is preferably in the range $0.25 \le Wb1/TW \le 0.40$ and more preferably in the range $0.27 \le Wb1/TW \le 0.35$ with respect to the tire ground contact width TW.

In addition, a maximum ground contact width Wb2 of the center land portion 32 is preferably in the range $0.30 \le Wb2/TW \le 0.60$, and more preferably in the range $0.40 \le Wb2/TW \le 0.50$, with respect to the tire ground contact width TW.

The ground contact widths of the land portions are each measured as a linear distance in the tire axial direction in a contact surface of the land portion and a flat plate, when the tire is mounted on a specified rim, inflated to a specified internal pressure, placed perpendicular to the flat plate in a static state, and subjected to a load corresponding to a specified load.

The tire ground contact width TW is measured as a linear distance in the tire axial direction of a contact surface of the tire and a flat plate when the tire is mounted on a specified rim, inflated to a specified internal pressure, placed perpendicular to the flat plate in a static state, and subjected to a load corresponding to a specified load.

A tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

Further, as illustrated in FIG. 2, the pair of shoulder land portions 31 and the center land portion 32 are arranged so as to overlap each other when viewed in the tire circumferential direction. Accordingly, the circumferential main groove 2 has the see-through-less structure when viewed in the tire circumferential direction.

Further, an overlap amount db between the shoulder land portion 31 and the center land portion 32 has the relationship $0 \leq db/TW \leq 0.10$ with respect to the tire ground contact width TW.

The overlap amount db of the land portions 31, 32 is measured as a distance in the tire width direction of measurement points of the maximum ground contact widths Wb1, Wb2 of the land portions 31, 32.

Shoulder Land Portion

Figure 3:
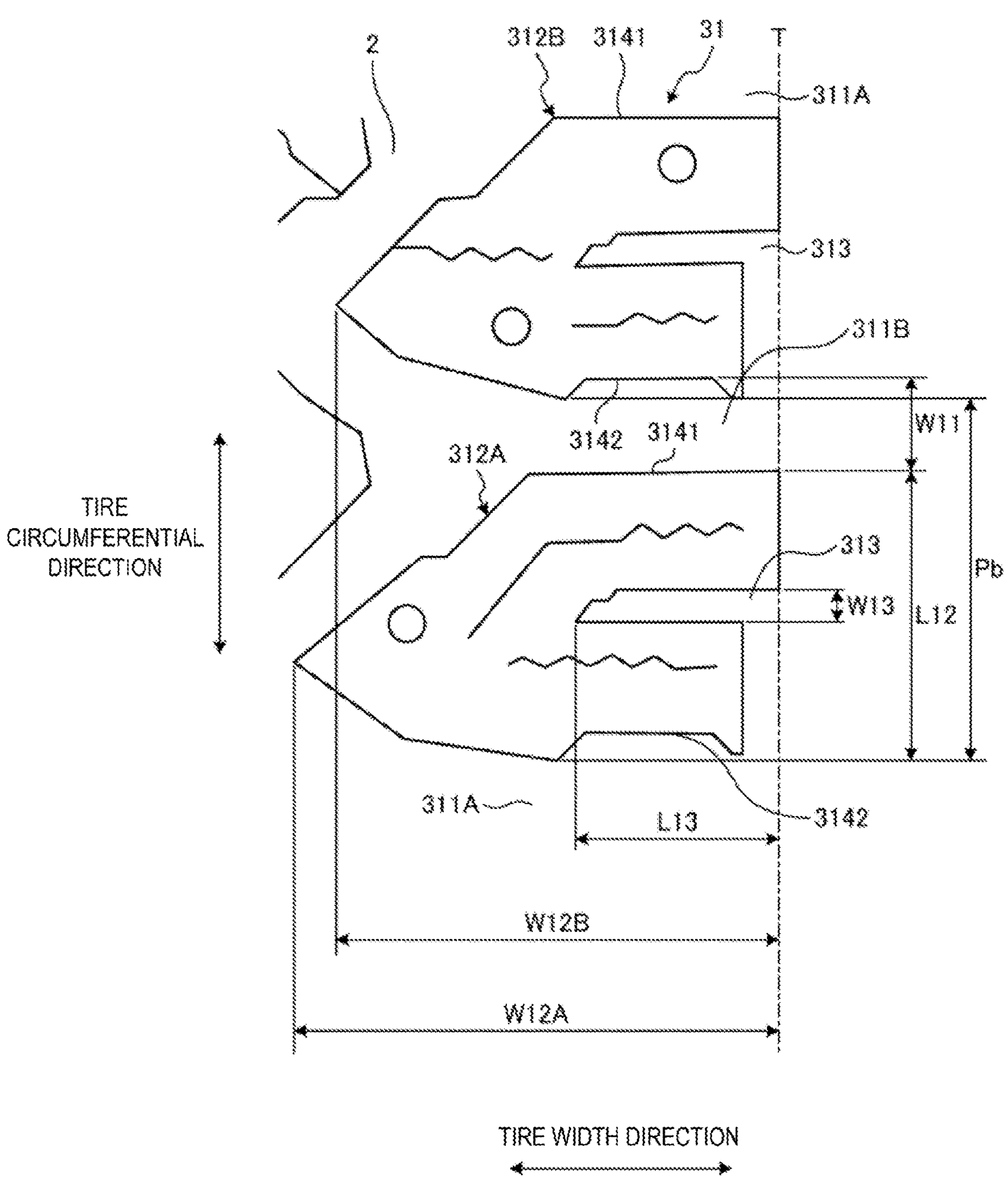
FIG. 3 is an enlarged view illustrating the shoulder land portion illustrated in FIG. 2.

FIG. 3 is an enlarged view illustrating the shoulder land portion 31 illustrated in FIG. 2.

As illustrated in FIGS. 2 and 3, the shoulder land portion 31 includes a plurality of shoulder lug grooves 311A, 311B and a plurality of shoulder blocks 312A, 312B defined and formed by these shoulder lug grooves 311A, 311B.

The shoulder lug grooves 311A, 311B extend in the tire width direction and open to the circumferential main groove 2 at one end and open to the tire ground contact edge T at the other end. Additionally, a plurality of the shoulder lug grooves 311A, 311B are arrayed at a predetermined interval in the tire circumferential direction. Moreover, the shoulder lug grooves 311A, 311B have a groove width W11 (see FIG. 3) of 13 mm or more and a groove depth H11 (see FIG. 5 described below) of 8.0 mm or more. In addition, the groove depth H11 of the shoulder lug grooves 311A, 311B is in the range $0.80 \leq H11/Hm \leq 1.00$ with respect to the groove depth Hm (not illustrated) of the circumferential main groove 2. Moreover, in the configuration of FIG. 2, first and second lug grooves 311A, 311B having mutually different shapes are alternately arrayed in the tire circumferential direction. Further, the total number of shoulder lug grooves 311A, 311B is the same as the number of zigzag-shaped pitches of the circumferential main groove 2, and these shoulder lug grooves 311A, 311B are each open to maximum amplitude positions of the circumferential main groove 2, to the outer side in the tire width direction.

The shoulder blocks 312A, 312B include a protruding edge portion that protrudes toward the tire equatorial plane CL side along the zigzag shape of the circumferential main groove 2 (see FIG. 2). Additionally, the plurality of shoulder blocks 312A, 312B are arrayed at a predetermined interval in the tire circumferential direction to form a single block row. Further, in the configuration of FIG. 2, first and second shoulder blocks 312A, 312B having mutually different shapes are alternately arrayed in the tire circumferential direction. Further, the total number of shoulder blocks 312A, 312B is the same as the number of zigzag-shaped pitches of the circumferential main groove 2.

Furthermore, in FIG. 3, the width W12 (W12A, W12B) of the shoulder blocks 312A, 312B is in the range $0.80 \leq W12/L12 \leq 2.20$ with respect to a circumferential length L12 of the shoulder blocks 312A, 312B, and preferably in the range $1.30 \leq W12/L12 \leq 1.80$. Accordingly, the rigidity of the shoulder blocks 312A, 312B is appropriately ensured. Additionally, in the configuration of FIG. 3, the width W12A of the elongated first shoulder block 312A corresponds to the ground contact width Wb1 of the shoulder land portion 31 when the tire comes into contact with the ground. Further, the ground contact width W12B of the short second shoulder block 312B is in the range $0.70 \leq W12B/W12A \leq 1.00$ with respect to the width W12A of the first shoulder block 312A.

The circumferential length L12 of the shoulder blocks 312A, 312B is the maximum distance of the extension length of the block in the tire circumferential direction, and is measured when the tire is mounted on a specified rim, inflated to a specified internal pressure, and in an unloaded state.

The widths W12A, W12B of the shoulder blocks 312A, 312B are the maximum distances of the extension lengths of the blocks in the tire width direction, and are measured when the tire is mounted on a specified rim, inflated to a specified internal pressure, and in an unloaded state.

Furthermore, as illustrated in FIG. 3, each of the shoulder blocks 312A, 312B includes a shoulder narrow groove 313. The shoulder narrow groove 313 terminates inside the shoulder blocks 312A, 312B at one end and opens to the tire ground contact edge T at the other end. Additionally, the groove width W13 of the shoulder narrow groove 313 is in the range $0.05 \leq W13/W11 \leq 0.50$ with respect to the groove width W11 of the shoulder lug grooves 311A, 311B, and is preferably in the range $0.15 \leq W13/W11 \leq 0.40$. Additionally, the groove width W13 of the shoulder narrow groove 313 is in the range of 0.8 mm or more and 10 mm or less. Moreover, an extension length L13 in the tire width direction of the shoulder narrow groove 313 is in the range $0.40 \leq L13/W12 \leq 0.80$ with respect to the width W12 (W12A, W12B) of the shoulder blocks 312A, 312B, and is preferably in the range $0.50 \leq L13/W12 \leq 0.70$. The lower limit described above of the ratio W13/W11, L13/W12 ensures the edge effect of the shoulder narrow groove 313, and ensures the tire snow performance. The upper limit describe above ensures the rigidity of the shoulder blocks 312A, 312B, and ensures the wear resistance performance of the tire. In the configuration of in FIG. 3, each of the shoulder blocks 312A, 312B has a V-shape defined and formed by the shoulder narrow groove 313, and is disposed with the top portion of the V-shape toward the tire equatorial plane CL side.

Note that in the configuration of FIG. 3, each of the shoulder blocks 312A, 312B includes a plurality of sipes (reference sign omitted in drawings), and a pin hole for inserting a studless pin (reference sign omitted in drawings).

Center Land Portion

As illustrated in FIG. 2, the center land portion 32 includes a plurality of inclined main grooves 321, a plurality of lateral grooves or auxiliary grooves (reference sign omitted in the drawings), and a plurality of center blocks 322 defined and formed by these grooves.

As illustrated in FIG. 2, the inclined main groove 321 inclines to the tire circumferential direction and extends therein, and intersects the tire equatorial plane CL. Further, the inclined main groove 321 opens to the circumferential main groove 2 at one end and terminates in the center land portion 32 at the other end. Further, the left and right inclined main grooves 321, 321 mutually incline in the same direction with respect to the tire circumferential direction and extend therein, and open to the left and right circumferential main grooves 2, 2. Moreover, the inclined main groove 321 has a groove width of 5.0 mm or more and a groove depth of 8.0 mm or more. In the configuration of FIG. 2, the inclined main groove 321 has the same maximum groove depth with respect to the circumferential main groove 2. Furthermore, the inclination angle (dimension symbol omitted in the drawings) of the inclined main groove 321 with respect to the tire equatorial plane CL is in the range of 25 degrees or more and 70 degrees or less.

The inclination angle of the inclined main groove 321 is measured as an angle between the groove center line of the inclined main groove 321 and the tire equatorial plane CL.

The center block 322 includes a protruding edge portion that protrudes toward the tire ground contact edge T side along the zigzag shape of the circumferential main groove 2. Additionally, the plurality of center blocks 322 are arranged at a predetermined interval in the tire circumferential direction. Further, in the configuration of FIG. 2, the same number of center blocks 322 as the number of zigzag-shaped pitches of the circumferential main groove 2 are arranged along the circumferential main groove 2 in the tire circumferential direction. Furthermore, each of the center blocks 322 includes a plurality of sipes (reference sign omitted in the drawings).

Side Block

As illustrated in FIG. 1, the tire 1 includes a side block 4 in a buttress portion. The side block 4 is a protrusion portion protruding from the side profile of the tire to the tire outer surface, and primarily has (1) a function of protecting the tire side portion from an external damage and increasing the cut resistance of the tire and (2) a function of improving the mud discharge properties of the buttress portion and increasing the mud performance of the tire.

The buttress portion is defined as a non-ground contacting region formed in a connection portion between the profile of the tread portion and the profile of the sidewall portion, and configures a sidewall surface on an outer side in the tire width direction of the shoulder land portion 31.

Figure 4:
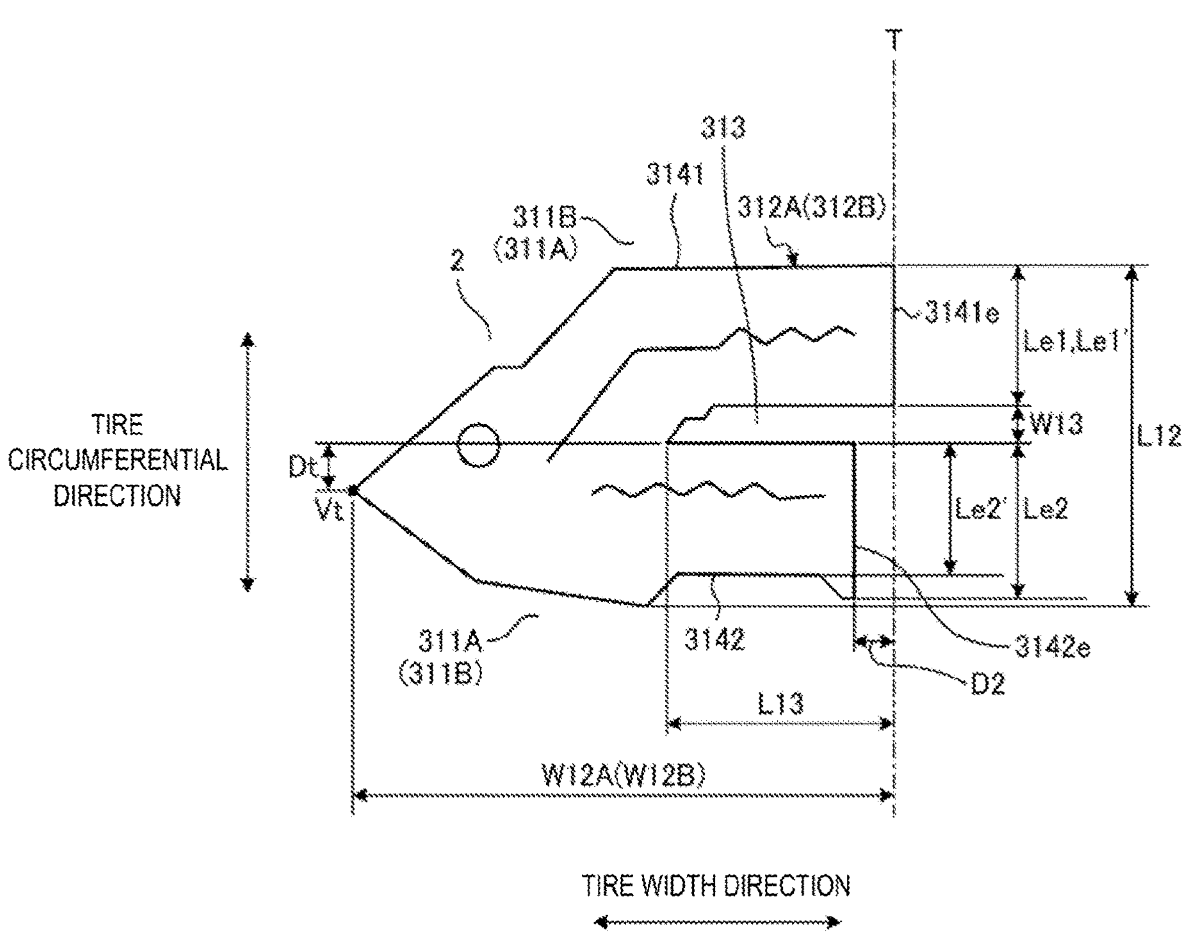
FIG. 4 is an enlarged plan view illustrating the shoulder block illustrated in FIG. 3.

The side profile is a contour line that approximates the outer surface of the sidewall from the bead portion to the buttress portion in a cross-sectional view in the tire meridian direction with a smooth arc, and is defined excluding the recess/protrusion portion formed in the tire side portion (partial protrusion portion such as the side block 4 and a split position M of the mold in FIG. 4).

The tire profile is a contour line of the tire in a cross-sectional view along the tire meridian direction, and is measured using a laser profiler. The laser profiler used may be, for example, a tire profile measuring device (available from Matsuo Co., Ltd.).

For example, in the configuration of FIG. 1, the side block 4 extends from the buttress portion to the inner side in the tire radial direction beyond the split position M of the mold, and terminates at the outer side in the tire radial direction from a maximum width position A of the side profile. Additionally, the side block 4 has the same height as the split position M of the mold, and has a trapezoidal cross-section having a constant height in a region on the inner side in the tire radial direction from the split position M of the mold. Additionally, the height of the side block 4 gradually decreases from the split position M of the mold toward the outer side in the tire radial direction so that the side block 4 is smoothly connected to the tire ground contact edge T.

The split position M of the mold is defined as a position corresponding to the connection portion of the split mold of the tire mold. A rib-shaped projection having a width of approximately 2 mm to 3 mm is formed by residual rubber that is caught when molding the tire vulcanization at the split position M. For example, in the configuration of FIG. 4, the split mold is formed of a first mold that advances/withdraws in the tire radial direction to form a tread portion and left and right second molds that advance/withdraw in the tire axial direction to form a side portion (not illustrated), so that the split position M of the mold is formed in the buttress portion of the tire. However, no such limitation is intended, and in the configuration in which the split mold of the tire mold is divided into two in the tire width direction (not illustrated), the split position M of the mold is not formed in the tire side portion, and is formed on the tread surface. In this case, the split position M of the mold in FIG. 4 is omitted.

Additionally, the height Hp (not illustrated) of the side block 4 is in the range 3.0 mm≤HP≤10 mm. The lower limit described above ensures the effect of improving the cut resistance and the mud performance of the tire by the side block 4 described above. According to the upper limit described above, a decrease in the degree of freedom of tire deformation due to the side block 4 becoming excessive is suppressed, and the ground contact characteristics of the tire are ensured.

The maximum height Hp of the side block 4 is measured as the maximum value of the projection height from the side profile to the top surface of the side block 4.

Branch Portion of Shoulder Block

FIG. 4 is an enlarged plan view illustrating the shoulder block 312A (312B) illustrated in FIG. 3.

In the configuration of FIG. 3, as described above, each of the shoulder blocks 312A, 312B includes the shoulder narrow groove 313 that terminates inside the shoulder blocks 312A, 312B at one end and opens to the tire ground contact edge T at the other end. Further, the shoulder blocks 312A, 312B have a V-shape defined and formed by the shoulder narrow groove 313, and are disposed with the top portion of the V-shape toward the tire equatorial plane CL side.

Additionally, as shown in FIG. 4, the shoulder block 312A (312B) includes first and second branch portions 3141, 3142. The branch portions 3141, 3142 are defined and formed by the shoulder narrow groove 313 and the shoulder lug grooves 311B, 311A, and extend along the shoulder narrow groove 313 in the tire width direction to constitute the V-shaped left and right branch portions described above of the shoulder block 312A (312B).

Furthermore, as illustrated in FIG. 4, the ground contact surface of the first branch portion 3141 is connected to the tire ground contact edge T, while the second branch portion 3142 is separated from the tire ground contact edge T. Specifically, an edge portion 3141*e* of the first branch portion 3141 is positioned at the tire ground contact edge T, and an edge portion 3142*e* of the second branch portion 3142 is more on the inner side in the tire width direction than the tire ground contact edge T. Accordingly, the edge portions 3141*e*, 3142*e* of the first and second branch portions 3141, 3142 are disposed mutually offset in the tire width direction.

The ground contact surface of the block is defined as a contact surface (specifically, a region surrounded by the contour line of the contact surface) between a tire and a flat plate when the tire is mounted on a specified rim, inflated to the specified internal pressure, placed perpendicular to the flat plate in a static state, and loaded with a load corresponding to the specified load.

The edge portions 3141*e*, 3142*e* of the branch portions 3141, 3142 are defined as the road contact surface and the non-ground contact surface on the outer side in the tire axial direction of the branch portions 3141, 3142, and specifically as connection portions between the side surfaces of the branch portions 3141, 3142.

For example, in the configuration of FIG. 4, the first and second branch portions 3141, 3142 include linear edge portions 3141*e*, 3142*e* that extend substantially parallel with (±10 degrees) with respect to the tire circumferential direction. Additionally, as illustrated in FIG. 3, the first branch portions 3141, 3141 of adjacent shoulder blocks 312A, 312B are positioned on the same side in the tire circumferential direction. Accordingly, the first and second branch portions 3141, 3142 of the shoulder blocks 312A, 312B are alternately arrayed in the tire circumferential direction (see FIG. 2).

In the configuration described above, the edge portions 3141*e* and 3142*e* on the outer side in the tire width direction of the first and second branch portions 3141 and 3142 divided by the shoulder narrow groove 313 are arranged mutually offset in the tire width direction, so that the snow discharge properties and mud discharge properties from the shoulder narrow groove 313 are improved, and the snow performance and mud performance of the tire are improved.

Furthermore, in FIG. 4, a circumferential length Le1 of the first branch portion 3141 is in the range $0.20 \le Le1/L12 \le 0.60$ with respect to the circumferential length L12 of the shoulder block 312A (312B), and is preferably in the range $0.30 \le Le1/L12 \le 0.50$. The lower limit described above ensures the rigidity of the first branch portion 3141, ensuring the wear resistance performance of the tire. The upper limit described above ensures an arrangement space of a circumferential length Le2 of the second branch portion 3142. Furthermore, a maximum width W13 of the shoulder narrow groove 313 is in the range $0.20 \le W13/Le1 \le 0.40$ with respect to the circumferential length Le1 of the first branch portion 3141, and is preferably in the range $0.25 \le W13/Le1 \le 0.35$. The lower limit described above ensures the snow column shear force by the shoulder narrow groove 313, ensuring the snow performance of the tire. The upper limit described above suppresses decrease in rigidity of the shoulder block 312A (312B) caused by the shoulder narrow groove 313 becoming wider, ensuring the wear resistance performance of the tire. Additionally, a circumferential length Le1' of the first branch portion 3141 at the tire ground contact edge T is in the range $0.70 \le Le1'/Le1 \le 1.00$ with respect to the circumferential length Le1 of the first branch portion 3141, and is preferably in the range $0.80 \le Le1'/Le1 \le 1.00$.

The circumferential lengths Le1, Le2, Le2' of 3141, 3142 are measured as the extension lengths in the tire circumferential direction of the road contact surfaces of 3141, 3142 in the region from the tire ground contact edge T to a position 50% of the distance L13 of the shoulder narrow groove 313.

Furthermore, in FIG. 4, the circumferential length Le2 of the second branch portion 3142 is in the range $0.20 \le Le2/L12 \le 0.60$ with respect to the circumferential length L12 of the shoulder block 312A (312B), and is preferably in the range $0.30 \le Le2/L12 \le 0.50$. The lower limit described above ensures the rigidity of the second branch portion 3142, ensuring the wear resistance performance of the tire. The upper limit described above ensures an arrangement space of the circumferential length Le1 of the first branch portion 3141. Furthermore, the circumferential length Le2 of the second branch portion 3142 is in the range $0.80 \le Le2/Le1 \le 1.20$ with respect to the circumferential length Le1 of the first branch portion 3141, and is preferably in the range $0.95 \le Le2/Le1 \le 1.10$. Accordingly, there is an advantage that the circumferential lengths Le1, Le2 of the first and second branch portions 3141, 3142 are made uniform, and wear of the shoulder block 312A (312B) is suppressed.

Additionally, in the configuration of FIG. 4, the ground contact surface of the second branch portion 3142 includes a widened portion (reference sign omitted in drawings) having the circumferential length widened toward the tire ground contact edge T. Accordingly, the circumferential length of the edge portion 3142*e* of the second branch portion 3142 (dimension symbol omitted in the drawings, while equal to the circumferential length Le2 in FIG. 4) is extended. In such a configuration, the widened portion of the second branch portion 3142 increases the snow column shear effect of the shoulder block 312A (312B), improving the snow traction performance of the tire.

Additionally, the minimum value Le2' and the maximum value Le2 of the circumferential length of the second branch portion 3142 in the region from the tire ground contact edge T to a position 50% of the distance L13 of the shoulder narrow groove 313 described above have the relationship $0.75 \le (Le2-Le2')/Le2 \le 0.95$, and preferably have the relationship $0.80 \le (Le2-Le2')/Le2 \le 0.90$.

Additionally, in FIG. 4, the distance D2 from the tire ground contact edge T to the edge portion 3142*e* of the second branch portion 3142 is in the range $0.02 \le D2/W12A \le 0.30$ with respect to the width W12A (W12B) of the shoulder block 312A (312B), and is preferably in the range $0.04 \le D2/W12A \le 0.20$. The lower limit described above ensures an offset amount (distance D2) in the tire width direction of the edge portions 3141*e*, 3142*e* of the first and second branch portions 3141, 3142, ensuring an effect of improving the snow discharge properties from the shoulder narrow groove 313. The upper limit described above ensures the extension length of the second branch portion 3142 in the tire width direction, ensuring the rigidity of the shoulder block 312A (312B).

For example, in the configuration of FIG. 4, the shoulder block 312A (312B) has a V-shape formed by connecting the first and second branch portions 3141, 3142 as described above, and is disposed with a vertex Vt of the V-shape toward the tire equatorial plane CL side. In addition, the vertex Vt of the V-shape is offset in the tire circumferential direction from the center of gravity (not illustrated) of the shoulder block 312A (312B), and specifically, is positioned closer to the second branch portion 3142 side than the shoulder narrow groove 313. Additionally, a distance Dt in the tire circumferential direction from the shoulder narrow groove 313 to the vertex Vt of the V-shape is in the range $0 \le Dt/L12 \le 0.35$ with respect to the circumferential length L12 of the shoulder block 312A (312B), and is preferably in the range $0.10 \le Dt/L12 \le 0.25$. Note that in the configuration of FIG. 4, the top portion of the V-shape has a triangular shape, but no such limitation is intended and the top portion of the V-shape may have a flat top surface (not illustrated). In this case, the vertex Vt of the V-shape is defined as the midpoint of the flat top surface.

Notch Portion in the Shoulder Block

Figure 5:
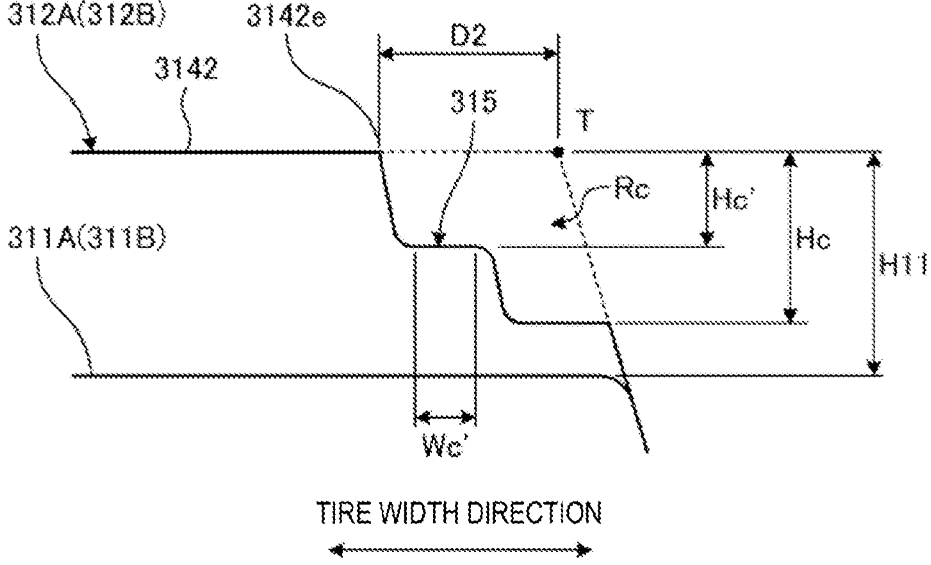
FIG. 5 is a cross-sectional view illustrating the shoulder block illustrated in FIG. 4.
Figure 6:
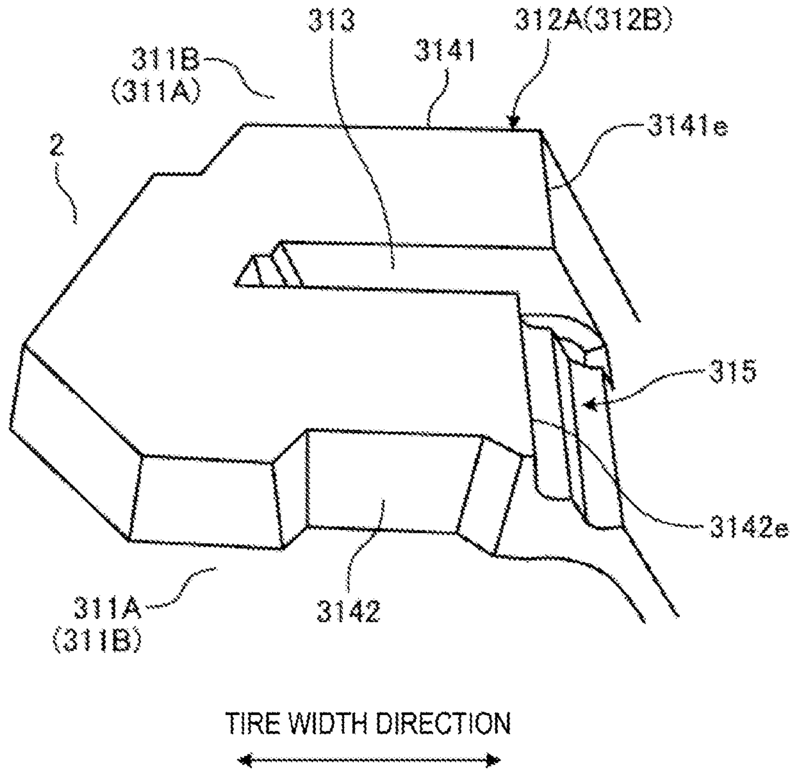
FIG. 6 is a perspective view illustrating the shoulder block illustrated in FIG. 4.

FIGS. 5 and 6 are a cross-sectional view (FIG. 5) and a perspective view (FIG. 6) illustrating the shoulder block 312A (312B) illustrated in FIG. 4.

In the configuration of FIG. 4, as described above, the ground contact surface of the first branch portion 3141 is connected to the tire ground contact edge T, and the second branch portion 3142 is separated from the tire ground contact edge T. At this time, as illustrated in FIGS. 5 and 6, the shoulder block 312A (312B) includes a notch portion 315 that connects the edge portion 3142*e* of the second branch portion 3142 and the buttress portion of the tire (reference sign omitted in the drawings). Conceptually, by cutting the edge portion 3142*e* on the tire ground contact edge T side of the second branch portion 3142 with the notch portion 315, the edge portion 3142*e* of the second branch portion 3142 is separated from the tire ground contact edge T.

Additionally, in a cross-sectional view in the tire meridian direction of FIG. 5, a region Rc surrounded by the tread profile, the profile of the buttress portion, and the wall surface of the notch portion 315 is defined. In FIG. 5, the region Rc is defined as a region surrounded by the broken line that extends the road contact surface of the shoulder block 312A (312B), the broken line that extends the wall surface of the buttress portion, and the solid line indicating the notch portion 315. At this time, an area SRc of the region Rc has the relationship 1.00 mm≤SRc/H11≤7.00 mm with respect to the groove depth H11 of the shoulder lug groove 311A (311B), and preferably has the relationship 2.00 mm≤SRc/H11≤6.00 mm. The lower limit described above ensures the volume of the notch portion 315, ensuring the effect of improving the snow discharge properties from the shoulder narrow groove 313 by the notch portion 315. The upper limit described above ensures the rigidity of the shoulder block 312A (312B).

Furthermore, a maximum depth Hc of the notch portion 315 is in the range 0.65≤Hc/H11≤0.95 with respect to the groove depth H11 of the shoulder lug groove 311A (311B), and is preferably in the range 0.70≤Hc/H11≤0.90.

For example, in the configuration illustrated in FIGS. 5 and 6, the notch portion 315 connects the edge portion 3142*e* of the second branch portion 3142 and the buttress portion of the tire (reference sign omitted in drawings). Additionally, the wall surface of the notch portion 315 has a step shape in a cross-sectional view in the tire meridian direction, and has a uniform cross-section in the tire circumferential direction. Accordingly, the step shape of the notch portion 315 has a flat road contact surface and a trailing surface that is substantially perpendicular to the road contact surface. Additionally, in FIG. 5, a distance Hc' from the tread contact surface to a first road contact surface of the step shape (defined as a road contact surface on the outermost side in the radial direction) is in the range 0.20≤Hc'/Hc≤0.50 with respect to the maximum depth Hc of the notch portion 315, and is preferably in the range 0.30≤Hc'/Hc≤0.40. Furthermore, a width Wc' of the first road contact surface of the step shape is in the range 0.40≤Wc'/D2≤0.70 with respect to the distance D2 from the tire ground contact edge T to the edge portion 3142*e* of the second branch portion 3142, and is preferably in the range 0.45≤Wc'/D2≤0.65. The lower limit described above ensures the rigidity of the shoulder block 312A (312B). The upper limit described above ensures the effect of improving the snow discharge properties from the shoulder narrow groove 313 by the notch portion 315.

Figure 7:
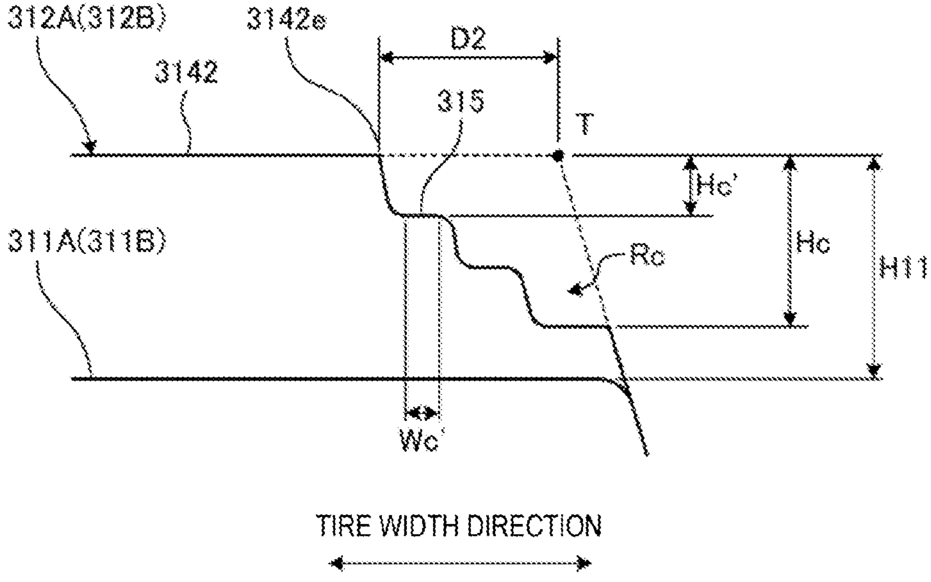
FIG. 7 is a cross-sectional view illustrating a modified example of the notch portion illustrated in FIG. 5.

FIG. 7 is a cross-sectional view illustrating a modified example of the notch portion 315 illustrated in FIG. 5.

In the configuration of FIG. 5, the notch portion 315 has a step shape formed by connecting the two road contact surfaces and the two trailing surfaces (reference sign omitted in drawings) so as to be substantially perpendicular to each other (in the range of 70 degrees or more and 110 degrees or less). Additionally, the two road contact surfaces are substantially parallel with the tread contact surface (in the range ±20 degrees), and the two trailing surfaces are substantially parallel with the profile of the buttress portion (in the range ±20 degrees).

In contrast, in the configuration of FIG. 7, the notch portion 315 has a step shape formed by connecting the three road contact surfaces (reference sign omitted in drawings) and the three trailing surfaces so as to be substantially perpendicular to each other. Additionally, as illustrated in FIGS. 5 and 7, the notch portion 315 preferably has a plurality of road contact surfaces between the road contact surface of the shoulder block 312A (312B) and the groove bottom of the shoulder lug groove 311A (311B). Accordingly, the edge components on the wall surface of the notch portion 315 increases, improving the snow traction properties of the tire.

Modified Example

Figure 8:
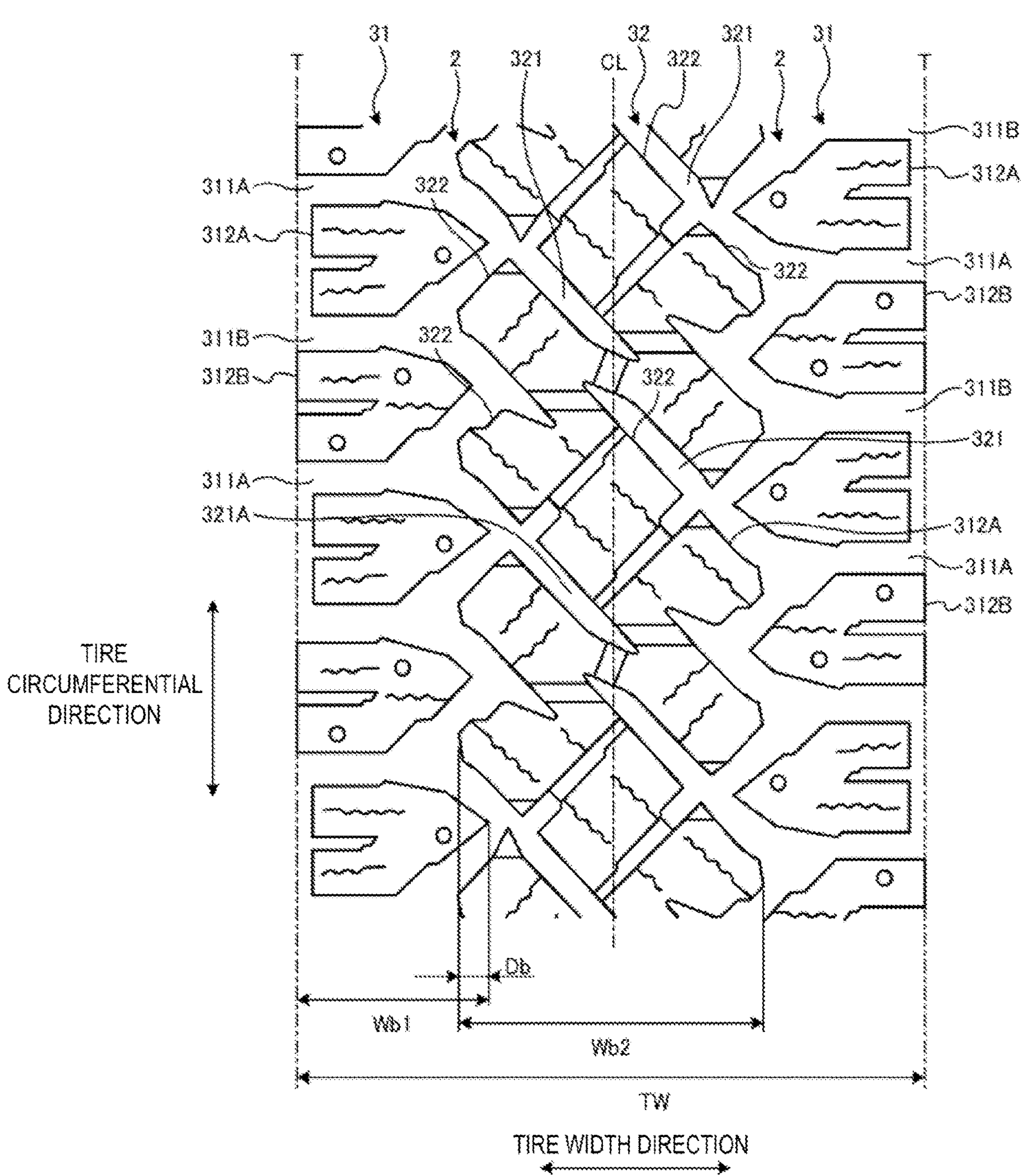
FIG. 8 is a plan view illustrating a modified example of the tread surface of the tire illustrated in FIG. 2.
Figure 9:
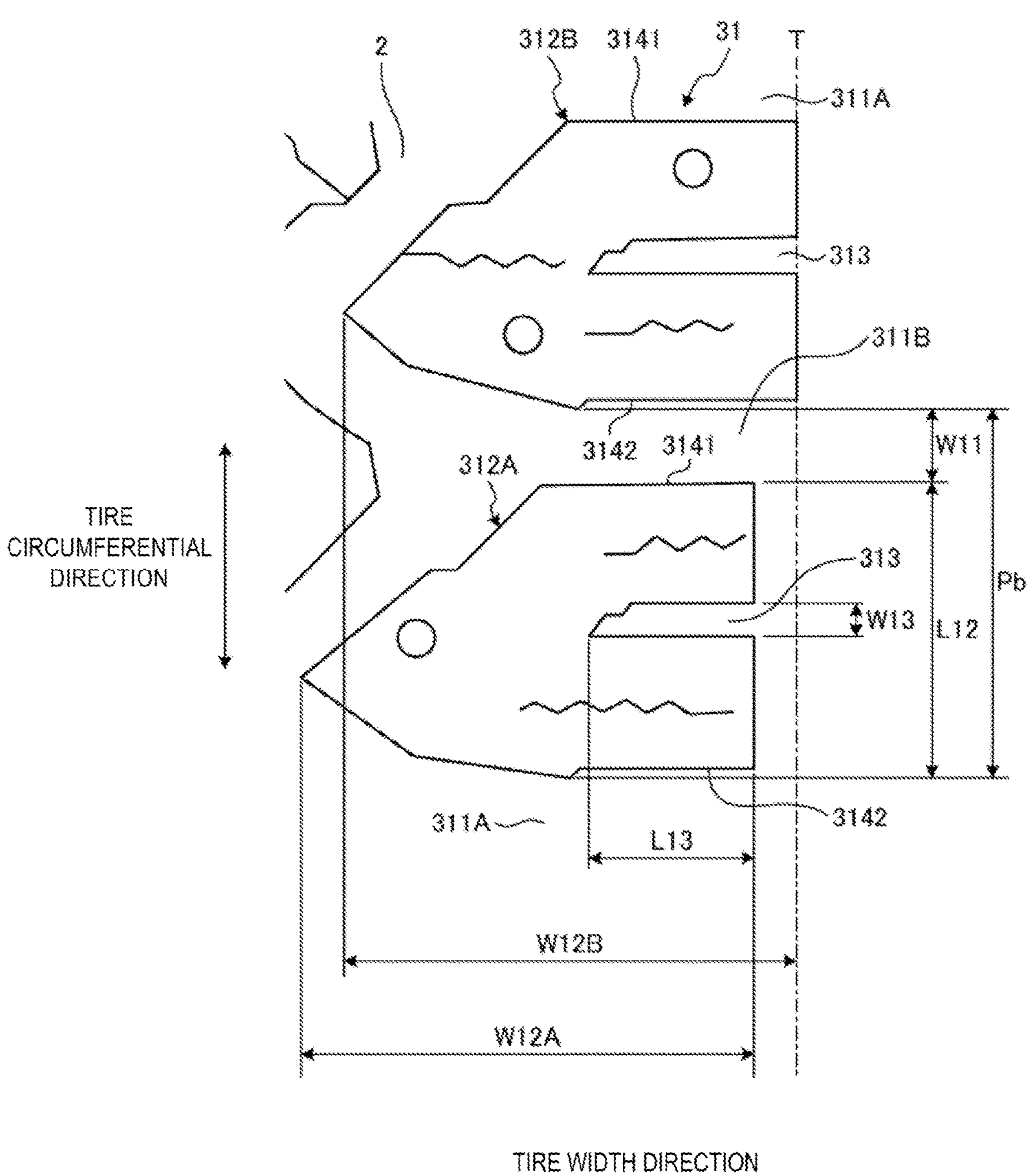
FIG. 9 is an enlarged view illustrating the shoulder land portion illustrated in FIG. 8.
Figure 10:
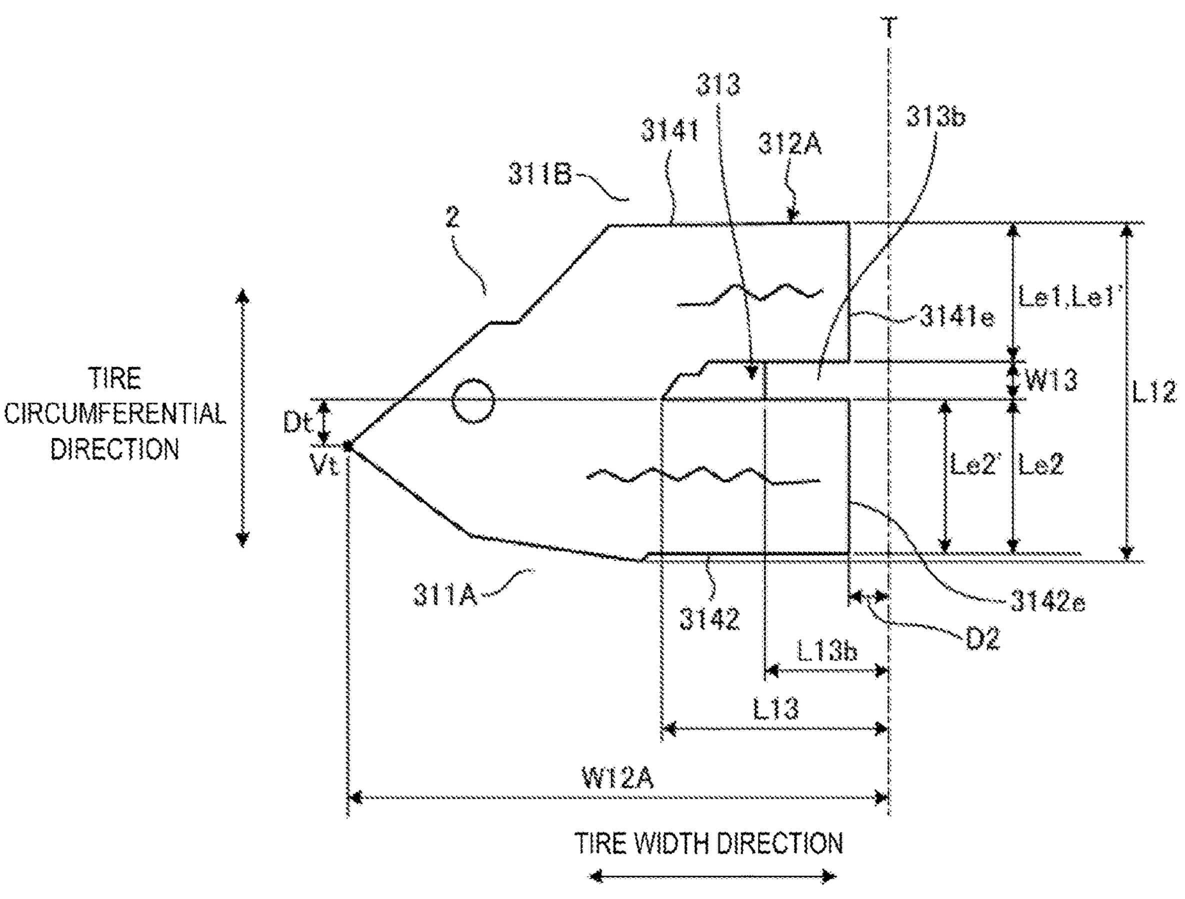
FIG. 10 is an enlarged plan view illustrating the shoulder block illustrated in FIG. 9.

FIG. 8 is a plan view illustrating a modified example of the tread surface of the tire 1 illustrated in FIG. 2. FIG. 9 is an enlarged view illustrating the shoulder land portion 31 illustrated in FIG. 8. FIG. 10 is an enlarged plan view illustrating the shoulder block 312A illustrated in FIG. 9. In these diagrams, the same constituents as those illustrated in FIGS. 2 to 4 are denoted by the same reference signs, and description thereof will be omitted.

In the configuration of FIG. 2, as illustrated in FIGS. 3 and 4, each of the shoulder blocks 312A, 312B includes the first branch portion 3141 that connects to the tire ground contact edge T, and the second branch portion 3142 that is separated from the tire ground contact edge T. Accordingly, the edge portions 3141*e*, 3142*e* of the first and second branch portions 3141, 3142 are disposed mutually offset in the tire width direction. Additionally, in the adjacent shoulder blocks 312A, 312B, the first branch portions 3141, 3141 that connect to the tire ground contact edge T are positioned in one direction (upper portion in the drawing) in the tire circumferential direction, and the second branch portions 3142, 3142 that are separated from the tire ground contact edge T are positioned in the other direction in the tire circumferential direction. Accordingly, the first and second branch portions 3141, 3142 of the shoulder blocks 312A, 312B are alternately arrayed in the tire circumferential direction (see FIG. 2).

In the configuration described above, the edge portions 3141*e* and 3142*e* on the outer side in the tire width direction of the first and second branch portions 3141 and 3142 divided by the shoulder narrow groove 313 are arranged mutually offset in the tire width direction, so that the snow discharge properties and mud discharge properties from the shoulder narrow groove 313 are improved, and the snow performance and mud performance of the tire are improved. Also, one of the shoulder blocks 312A, 312B includes both the first branch portion 3141 connected to the tire ground contact edge T and the second branch portion 3142 separated from the tire ground contact edge T, and thus the rigidity of the adjacent shoulder blocks 312A, 312B is made uniform.

In contrast, in the configuration of FIG. 8, the shoulder land portion 31 includes the first shoulder block 312A that is separated from the tire ground contact edge T, and the second shoulder block 312B that is connected to the tire ground contact edge T. Additionally, the first shoulder block 312A and the second shoulder block 312B are arrayed alternately in the tire circumferential direction.

Specifically, as illustrated in FIG. 9, the first and second shoulder blocks 312A, 312B each include a shoulder narrow groove 313 that terminates inside the shoulder blocks 312A, 312B at one end and opens to the tire ground contact edge T at the other end, and a pair of branch portions 3141, 3142 defined and formed by the shoulder narrow groove 313. Also, both branch portions 3141, 3142 of the first shoulder block 312A are separated from the tire ground contact edge T, while both branch portions 3141, 3142 of the second shoulder block 312B are connected to the tire ground contact edge T.

Additionally, in the configuration of FIG. 9, the first and second shoulder blocks 312A, 312B each include linear edge portions 3141*e*, 3142*e* that extend substantially parallel (±10 degrees) with the tire circumferential direction. In addition, the pair of edge portions 3141*e*, 3142*e* of the first shoulder block 312A are at substantially the same position in the tire width direction, and specifically, the distance (not illustrated) between the pair of edge portions 3141*e* and 3142*e* in the tire width direction is in the range 0% or more and 10% or less with respect to the width W12 of the first shoulder block 312A. Additionally, both edge portions 3141*e*, 3142*e* on the outer side in the tire width direction of the second shoulder block 312B are located on the tire ground contact edge T. As a result, the pair of edge portions 3141*e*, 3142*e* of the first shoulder block 312A and a pair of edge portions of the second shoulder block 312B are arrayed alternately in the tire circumferential direction while mutually offset in the tire width direction (see FIG. 8).

Furthermore, in FIG. 9, the width W12 of the first shoulder block 312A is set substantially equal to the width W12B of the second shoulder block 312B, specifically in the range 0.90≤W12A/W12B≤1.10 and preferably in the range 0.95≤W12A/W12B≤1.05. Accordingly, the rigidity of the first and second shoulder blocks 312A, 312B is made uniform.

Additionally, in FIG. 10, the distance D2 from each of the pair of edge portions 3141*e*, 3142*e* of the first shoulder block 312A to the tire ground contact edge T is in the range 0.02≤D2/W12A≤0.30 with respect to the width W12A of the first shoulder block 312A, and is preferably in the range 0.04≤D2/W12A≤0.20. The lower limit described above ensures an offset amount (distance D2) of the pair of edge portions 3141*e*, 3142*e* in the tire width direction, ensuring an effect of improving the snow discharge properties from the shoulder narrow groove 313. The upper limit described above ensures the extension length of the pair of edge portions 3141*e*, 3142*e* in the tire width direction, ensuring the rigidity of the first shoulder block 312A.

Note that, in the configuration of FIG. 4, the ground contact surface of the branch portion 3142 of the shoulder block 312A includes a widened portion (reference sign omitted in drawings) having the circumferential length widened toward the tire ground contact edge T, as described above. However, no such limitation is intended, as illustrated in FIG. 10, the branch portion 3142 of the shoulder block 312A may include a straight-shaped circumferential edge portion.

Figure 11:
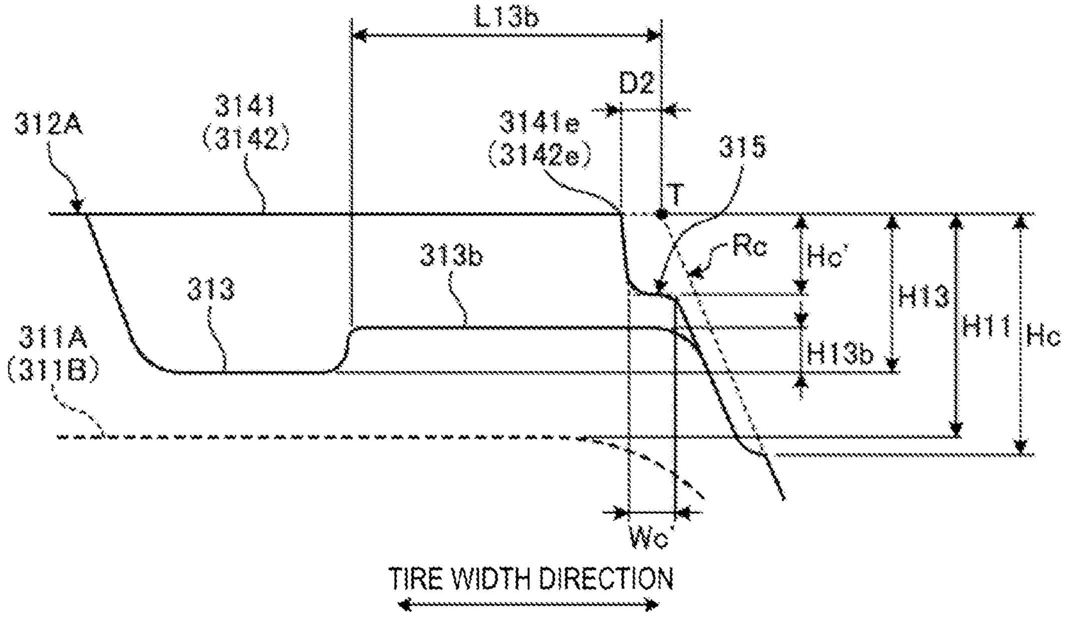
FIG. 11 is a cross-sectional view illustrating the shoulder block illustrated in FIG. 10.
Figure 12:
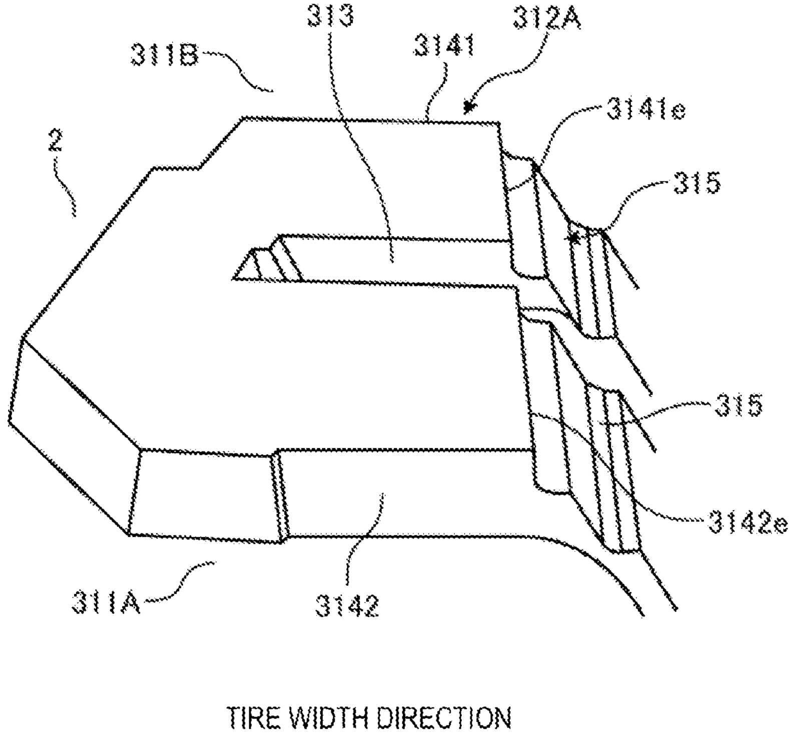
FIG. 12 is a perspective view illustrating the shoulder block illustrated in FIG. 10.

FIG. 11 is a cross-sectional view illustrating the shoulder block 312A illustrated in FIG. 10. FIG. 12 is a perspective view illustrating the shoulder block 312A illustrated in FIG. 10.

In the configuration of FIG. 10, each of the pair of edge portions 3141*e*, 3142*e* of the first shoulder block 312A is separated from the tire ground contact edge T, as described above. Furthermore, as illustrated in FIGS. 11 and 12, the first shoulder block 312A includes a notch portion 315 that connects the pair of edge portions 3141*e*, 3142*e* and the buttress portion of the tire.

Furthermore, in FIG. 11, when defining the region Rc surrounded by the tread profile, the profile of the buttress portion, and the wall surface of the notch portion 315, the area SRc of the region Rc has the relationship 1.00 mm≤SRc/H11≤7.00 mm with respect to the groove depth H11 of the shoulder lug groove 311A (311B), and preferably has the relationship 2.00 mm≤SRc/H11≤6.00 mm. The lower limit described above ensures the volume of the notch portion 315, ensuring the effect of improving the snow discharge properties from the shoulder narrow groove 313 by the notch portion 315. The upper limit described above ensures the rigidity of the shoulder block 312A (312B).

Furthermore, in FIG. 11, the maximum depth Hc of the notch portion 315 is in the range 0.65≤Hc/H11≤0.95 with respect to the groove depth H11 of the shoulder lug groove 311A (311B), and is preferably in the range 0.70≤Hc/H11≤0.90. Furthermore, the maximum depth He of the notch portion 315 is in the range 0.70≤Hc/H13≤1.20 with respect to the maximum depth H13 of the shoulder narrow groove 313, and is preferably in the range 0.80≤Hc/H13≤1.10. In the configuration of FIG. 11, the maximum depth Hc of the notch portion 315 is deeper than the maximum depth H13 of the shoulder narrow groove 313 (H13<Hc). Moreover, the maximum depth H13 of the shoulder narrow groove 313 is in the range 0.45≤H13/H11≤0.95 with respect to the groove depth H11 of the shoulder lug groove 311A (311B).

Additionally, as illustrated in FIG. 11, the notch portion 315 has a step-shaped wall surface in a cross-sectional view in the tire meridian direction. Specifically, in a cross-sectional view in the tire meridian direction, the notch portion 315 has a step shape formed by alternately connecting a flat road contact surface and a trailing surface substantially perpendicular (in a range of 70 degrees or more and 110 degrees or less) to the road contact surface. Additionally, as illustrated in FIG. 12, the notch portion 315 has a uniform cross-section in the tire circumferential direction. Additionally, a first trailing surface of the notch portion 315 (defined as the trailing surface on the outermost side in the radial direction) is substantially parallel with the profile of the buttress portion (in the range ±20 degrees), and the first road contact surface of the notch portion 315 (defined as the road contact surface on the outermost side in the radial direction) is substantially parallel with the tread contact surface (in the range ±20 degrees).

Further, in the configuration of FIG. 11, the step shape of the notch portion 315 is formed by connecting two road contact surfaces and two trailing surfaces so as to be substantially perpendicular to each other. However, no such limitation is intended, the step shape of the notch portion 315 may have three road contact surfaces and three trailing surfaces as illustrated in FIG. 7 described above.

Additionally, in FIG. 11, a distance Hc' from the tread contact surface to the first road contact surface of the step shape is in the range 0.20≤Hc'/Hc≤0.50 with respect to the maximum depth Hc of the notch portion 315, and is preferably in the range 0.30≤Hc'/Hc≤0.40.

Furthermore, a width Wc' of the first road contact surface of the step shape is in the range 0.40≤Wc'/D2≤0.70 with respect to the distance D2 from the tire ground contact edge T to the edge portions 3141*e*, 3142*e*, and is preferably in the range 0.45≤Wc'/D2≤0.65. The lower limit described above ensures the rigidity of the shoulder block 312A (312B). The upper limit described above ensures the effect of improving the snow discharge properties from the shoulder narrow groove 313 by the notch portion 315.

The width Wc' of the first road contact surface is measured as a distance in the tire width direction with the intersection point of the imaginary line extended from the first road contact surface and the imaginary line extended from the upper and lower trailing surfaces as an end point in a cross-sectional view in the tire meridian direction.

Additionally, as illustrated in FIGS. 10 and 11, the shoulder narrow groove 313 preferably includes a raised bottom portion 313*b* in the groove bottom. The raised bottom portion 313*b* connects the pair of branch portions 3141, 3142 of the shoulder block 312A as illustrated in FIG. 10, and rises from the middle of the shoulder narrow groove 313 and extends to the buttress portion as illustrated in FIG. 11. Accordingly, the rigidity of the shoulder block 312A is reinforced.

Additionally, in FIG. 10, an extension length L13*b* from the tire ground contact edge T to the terminating end portion of the inner side in the tire width direction of the raised bottom portion 313*b*, that is, the terminating end portion in the shoulder narrow groove 313 is in the range 0.25≤L13*b*/L13≤0.75, and preferably is in the range 0.40≤L13*b*/L13≤0.60, with respect to the extension length L13 of the shoulder narrow groove 313. The lower limit described above ensures reinforcement of rigidity by the raised bottom portion 313*b* and the upper limit described above ensures the groove volume of the shoulder narrow groove 313.

Effect 1

As described above, [1A] the tire 1 includes first and second circumferential main grooves 2, 2 extending in the tire circumferential direction, the pair of shoulder land portions 31, 31 and the one center land portion 32 defined by the first and second circumferential main grooves 2, 2 (see FIG. 2). Further, the shoulder land portion 31 includes the plurality of shoulder lug grooves 311A, 311B and the plurality of shoulder blocks 312A, 312B defined and formed by the plurality of shoulder lug grooves 311A, 311B. Additionally, the shoulder blocks 312A, 312B include the shoulder narrow groove 313 that terminates inside the shoulder blocks 312A, 312B at one end and opens to the tire ground contact edge T at the other end, and the first and second branch portions 3141, 3142 defined and formed by the shoulder narrow groove 313 (see FIG. 3). Further, the edge portion 3141*e* on the outer side in the tire width direction of the first branch portion 3141 is connected to the tire ground contact edge T, and the edge portion 3142*e* on the outer side in the tire width direction of the second branch portion 3142 is separated from the tire ground contact edge T (see FIG. 4).

In such a configuration, the edge portions 3141*e*, 3142*e* on the outer side in the tire width direction of the first and second branch portions 3141, 3142 defined by the shoulder narrow groove 313 are disposed mutually offset in the tire width direction, and thus there is an advantage of improving the snow discharge properties from the shoulder narrow groove 313, improving the tire snow performance.

Furthermore, [2A] the tire 1 has the same configuration as the tire 1 of [1A] described above except that the groove width W13 of the shoulder narrow groove 313 is in the range 0.05≤W13/W11≤0.50 with respect to the groove width W11 of the shoulder lug groove (see FIG. 4). The lower limit described above has the advantage of ensuring the edge effect of the shoulder narrow groove 313, ensuring the tire snow performance. The upper limit described above has the advantage of ensuring the rigidity of the shoulder blocks 312A, 312B, ensuring the wear resistance performance of the tire.

Additionally, [3A] the tire 1 has the same configuration as the tire 1 of [1A] or [2A] described above except that the extension length L13 of the shoulder narrow groove 313 in the tire width direction is in the range 0.40≤L13/W12≤0.80 with respect to the width W12 of the shoulder blocks 312A, 312B (see FIG. 4). The lower limit described above has the advantage of ensuring the edge effect of the shoulder narrow groove 313, ensuring the tire snow performance. The upper limit described above has the advantage of ensuring the rigidity of the shoulder blocks 312A, 312B, ensuring the wear resistance performance of the tire.

Additionally, [4A] the tire 1 has the same configuration as the tire 1 of any one of [1A] to [3A] described above except that the circumferential length Le1 of the first branch portion 3141 is in the range 0.20≤Le1/L12≤0.60 with respect to the circumferential length L12 of the shoulder block 312A (312B) (see FIG. 4). The lower limit described above has the advantage of ensuring the rigidity of the first branch portion 3141, ensuring the wear resistance performance of the tire. The upper limit described above has the advantage of ensuring an arrangement space of the circumferential length Le2 of the second branch portion 3142.

Additionally, [5A] the tire 1 has the same configuration as the tire 1 of any one of [1A] to [4A] described above except that the maximum width W13 of the shoulder narrow groove 313 is in the range 0.20≤W13/Le1≤0.40 with respect to the circumferential length Le1 of the first branch portion 3141 (see FIG. 4). The lower limit described above has the advantage of ensuring the snow column shear force by the shoulder narrow groove 313, ensuring the tire snow performance. The upper limit described above has the advantage of suppressing the decrease in rigidity of the shoulder block 312A (312B) caused by the shoulder narrow groove 313 becoming wider, ensuring the wear resistance performance of the tire.

Additionally, [6A] the tire 1 has the same configuration as the tire 1 of any one of [1A] to [5A] described above except that the distance D2 from the tire ground contact edge T to the edge portion 3142*e* of the second branch portion 3142 is in the range 0.05≤D2/W12≤0.30 with respect to the width W12 (W12A, W12B) of the shoulder block 312A (312B) (see FIG. 4). The lower limit described above has the advantage of ensuring the offset amount (distance D2) of the edge portions 3141*e* and 3142*e* of the first and second branch portions 3141 and 3142 in the tire width direction, ensuring the effect of improving the snow discharge properties from the shoulder narrow groove 313. The upper limit described above has the advantage of ensuring the extension length of the second branch portion 3142 in the tire width direction, ensuring the rigidity of the shoulder block 312A (312B).

Additionally, [7A] the tire 1 has the same configuration as the tire 1 of any one of [1A] to [6A] described above except that the circumferential length Le2 of the second branch portion 3142 is in the range 0.80≤Le2/Le1≤1.20 with respect to the circumferential length Le1 of the first branch portion 3141 (see FIG. 4). Accordingly, there is an advantage that the circumferential lengths Le1, Le2 of the first and second branch portions 3141, 3142 are made uniform, and wear of the shoulder block 312A (312B) is suppressed.

Additionally, [8A] the tire 1 has the same configuration as the tire 1 of any one of [1A] to [7A] described above except that the ground contact surface of the second branch portion 3142 includes a widened portion (reference sign omitted in drawings) having the circumferential length widened toward the tire ground contact edge T (see FIG. 4). Additionally, the minimum value Le2' and the maximum value Le2 of the circumferential length of the second branch portion 3142 have the relationship 0.75≤(Le2−Le2')/Le2≤0.95. In such a configuration, there is an advantage of increasing the snow column shear effect of the shoulder block 312A (312B) by the widened portion of the second branch portion 3142, improving the snow traction performance of the tire.

Additionally, [9A] the tire 1 has the same configuration as the tire 1 of any one of [1A] to [8A] described above except that the ground contact width Wb1 of the shoulder land portion 31 is in the range 0.25≤Wb1/TW≤0.40 with respect to the tire ground contact width TW (see FIG. 2). Accordingly, there is an advantage that the ground contact width Wb1 of the shoulder land portion 31 is properly set.

Additionally, [10A] the tire 1 has the same configuration as the tire 1 of any one of [1A] to [9A] described above except that the shoulder block 312A (312B) includes the notch portion 315 connecting the edge portion of the second branch portion 3142 and the buttress portion of the tire (reference sign omitted in drawings) (see FIG. 5). Furthermore, in a cross-sectional view in the tire meridian direction, when defining the region Rc surrounded by the tread profile, the profile of the buttress portion, and the wall surface of the notch portion 315, the area SRc of the region Rc has the relationship 1.00 mm≤SRc/H11≤7.00 mm with respect to the groove depth H11 of the shoulder lug groove 311A (311B). The lower limit described above has the advantage of ensuring the volume of the notch portion 315, ensuring the effect of improving the snow discharge properties from the shoulder narrow groove 313 by the notch portion 315. The upper limit described above has the advantage of ensuring the rigidity of the shoulder block 312A (312B).

Additionally, [11A] the tire 1 has the same configuration as the tire 1 of [10A] described above except that the maximum depth Hc of the notch portion 315 is in the range 0.65≤Hc/H11≤0.95 with respect to the groove depth H11 of the shoulder lug groove 311A (311B) (see FIG. 5). The lower limit described above has the advantage of ensuring the rigidity of the shoulder block 312A (312B). The upper limit described above has the advantage of ensuring the effect of improving the snow discharge properties from the shoulder narrow groove 313 by the notch portion 315.

Additionally, [12A] the tire 1 has the same configuration as the tire 1 of [10A] or [11A] described above except that the wall surface of the notch portion 315 has a step shape in a cross-sectional view in the tire meridian direction (see FIG. 5). Accordingly, there is an advantage of increasing the edge component on the wall surface of the notch portion 315, improving the snow traction properties of the tire.

Effect 2

As described above, [1B] the tire 1 includes a plurality of circumferential main grooves 2 extending in the tire circumferential direction, and the pair of shoulder land portions 31, 31 and the one or more rows of center land portions 32 defined by the plurality of circumferential main grooves 2 (see FIGS. 2 and 8). Further, at least one of the pair of shoulder land portions 31, 31 includes the plurality of shoulder lug grooves 311A, 311B and the plurality of shoulder blocks 312A, 312B defined and formed by the plurality of shoulder lug grooves 311A, 311B. Additionally, at least a part of the plurality of shoulder blocks 312A, 312B includes the notch portion 315 that connects the edge portions 3141*e*, 3142*e* separated from the tire ground contact edge T and the buttress portion (see FIGS. 5, 6, 11, and 12). Additionally, the notch portion 315 has a step-shaped wall surface in a cross-sectional view in the tire meridian direction.

Figure 17:
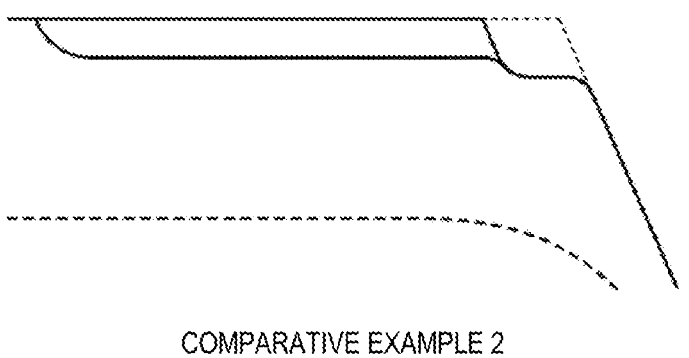
FIG. 17 is an explanatory diagram illustrating the test tire of Comparative Example 2.

In such a configuration, the shoulder blocks 312A, 312B include the notch portion 315 that connects the edge portions 3141*e*, 3142*e* and the buttress portion, and the notch portion 315 has the step-shaped wall surface in a cross-sectional view in the tire meridian direction, and thus there is an advantage that the rigidity of the shoulder block is ensured and the uneven wear resistance performance of the tire is improved, as compared to a configuration in which the notch portion has an L-shaped wall surface (see FIG. 17 described below). In addition, compared to a configuration in which the edge portion of the shoulder block is directly connected to the buttress portion without including a notch portion, there is an advantage of improving the snow performance of the tire due to the snow discharge effect of the notch portion 315.

Additionally, [2B] the tire 1 has the same configuration as the tire 1 of [1B] described above except that the distance D2 from the edge portions 3141*e*, 3142*e* of the shoulder blocks 312A, 312B to the tire ground contact edge T is in the range 0.05≤D2/W12≤0.30 with respect to the width W12 (W12A, W12B) of the shoulder blocks 312A, 312B (see FIGS. 4 and 10). There is an advantage that the lower limit described above ensures an offset amount (distance D2) of the edge portions 3141*e*, 3142*e* of the shoulder blocks 312A, 312B in the tire width direction, ensuring the snow discharge effect of the notch portion 315, and the upper limit described above ensures the extension length of the second branch portion 3142 in the tire width direction, ensuring the rigidity of the shoulder blocks 312A, 312B.

Additionally, [3B] the tire 1 has the same configuration as the tire 1 of [2B] described above except that in a cross-sectional view in the tire meridian direction, a region Rc surrounded by the tread profile, the profile of the buttress portion, and the wall surface of the notch portion 315 is defined. At this time, the area SRc of the region Rc has a relationship 1.00 mm≤SRc/H11≤7.00 mm with respect to the groove depth H11 of the shoulder lug grooves 311A, 311B (see FIGS. 5 and 11). The lower limit described above has the advantage of ensuring the volume of the notch portion 315, ensuring the snow discharge effect of the notch portion 315, and the upper limit described above has the advantage of ensuring the extension length of the second branch portion 3142 in the tire width direction, ensuring the rigidity of the shoulder blocks 312A, 312B.

Moreover, [4B] the tire 1 has the same configuration as the tire 1 of any one of [1B] to [3B] described above except that the depth Hc of the notch portion 315 is in the range 0.65≤Hc/H11≤0.95 with respect to the maximum groove depth H11 of the shoulder lug grooves 311A, 311B (see FIGS. 5 and 11). There is an advantage that the lower limit described above ensures the rigidity of the shoulder blocks 312A, 312B, and the upper limit described above ensures the snow discharge effect of the notch portion 315.

Additionally, [5B] the tire 1 has the same configuration as the tire 1 of any one of [1B] to [4A] described above except that the step shape of the notch portion 315 is formed by alternately connecting two or more road contact surfaces and two or more trailing surfaces in a range of 70 degrees or more and 110 degrees or less (see FIGS. 5, 7, and 11). Accordingly, there is an advantage of improving the snow discharge effect of the notch portion 315 since the road contact surface and the trailing surface of the step shape are substantially perpendicular to each other.

Additionally, [6B] the tire 1 has the same configuration as the tire 1 of [5A] described above except that the road contact surface on the outermost side in the radial direction among the two or more road contact surfaces having a step shape is defined as the first road contact surface. Furthermore, the distance Hc' from the tread contact surface to the first road contact surface is in the range 0.20≤Hc'/Hc≤0.50 with respect to the maximum depth Hc of the notch portion 315 (see FIGS. 5, 7, and 12). There is an advantage that the lower limit described above ensures the distance Hc' to the first road contact surface, improving the snow discharge effect of the notch portion 315, and that the upper limit described above ensures the rigidity of the shoulder blocks 312A, 312B.

Additionally, [7B] the tire 1 has the same configuration as the tire 1 of [5B] or [6B] described above except that the width Wc' of the first road contact surface is in the range 0.40≤Wc'/D2≤0.70 with respect to the distance D2 from the tire ground contact edge T to the edge portions 3141*e*, 3142*e* (see FIGS. 5, 7, and 12). There is an advantage that the lower limit described above ensures the rigidity of the shoulder block 312A (312B), and the upper limit described above ensures the effect of improving the snow discharge properties of the notch portion 315 from the shoulder narrow groove 313.

Additionally, [8B] the tire 1 has the same configuration as the tire 1 of any one of [1B] to [7B] described above except that the shoulder blocks 312A, 312B include a shoulder narrow groove 313 that terminates inside the shoulder blocks 312A, 312B at one end and opens to the tire ground contact edge T at the other end, and a pair of branch portions 3141, 3142 defined and formed by the shoulder narrow groove 313. Additionally, at least one of the pair of branch portions 3141, 3142 includes the notch portion 315 (see FIGS. 4, 10). Accordingly, there is an advantage of ensuring the snow discharge effect of the notch portion 315 and improving the snow discharge properties from the shoulder narrow groove 313.

Furthermore, [9B] the tire 1 has the same configuration as the tire 1 of [8B] described above except that the groove width W13 of the shoulder narrow groove 313 is in the range 0.05≤W13/W11≤0.50 with respect to the groove width W11 of the shoulder lug grooves 311A, 311B (see FIGS. 4 and 10). The lower limit described above has the advantage of ensuring the edge effect of the shoulder narrow groove 313, ensuring the tire snow performance. The upper limit described above has the advantage of ensuring the rigidity of the shoulder blocks 312A, 312B, ensuring the wear resistance performance of the tire.

Additionally, [10B] the tire 1 has the same configuration as the tire 1 of [8B] or [9B] described above except that the extension length L13 of the shoulder narrow groove 313 in the tire width direction is in the range 0.40≤L13/W12≤0.80 with respect to the width W12 (W12A, W12B) of the shoulder blocks 312A, 312B (see FIGS. 4 and 10). There is an advantage that the lower limit describe above ensures the edge effect of the shoulder narrow groove 313, ensuring the snow performance of the tire, and the upper limit described above ensures the rigidity of the shoulder blocks 312A, 312B, ensuring the wear resistance performance of the tire.

Additionally, [11B] the tire 1 has the same configuration as the tire 1 of any one of [1B] to [10B] described above except that the plurality of shoulder blocks 312A, 312B include the first shoulder block 312A separated from the tire ground contact edge T, and the second shoulder block 312B connected to the tire ground contact edge T (see FIG. 8). Additionally, the first shoulder block 312A includes the shoulder narrow groove 313 that terminates inside the first shoulder block 312A at one end and opens to the tire ground contact edge T at the other end, and a pair of branch portions 3141, 3142 defined and formed by the shoulder narrow groove 313 (see FIG. 9). Additionally, each of the pair of branch portions 3141, 3142 includes the notch portion 315 (see FIGS. 11 and 12). In such a configuration, the plurality of shoulder blocks 312A, 312B are provided with the first shoulder block 312A separated from the tire ground contact edge T and the second shoulder block 312B connected to the tire ground contact edge T, and thus there is an advantage that the difference in rigidity of the first and second shoulder blocks 312A, 312B is reduced and uneven wear resistance performance is improved, as compared to a configuration in which all shoulder blocks are connected to the tire ground contact edge (see FIG. 2).

Additionally, [12B] the tire 1 has the same configuration as the tire 1 of [11B] described above except that the width W12A of the first shoulder block 312A is in the range 0.90≤W12A/W12B≤1.10 with respect to the width W12B of the second shoulder block 312B (see FIG. 9). Accordingly, there is an advantage of making the rigidity of the shoulder blocks 312A, 312B uniform and improving the uneven wear resistance performance of the tire.

Target of Application

In this embodiment, as described above, a pneumatic tire is described as an example of a tire. However, no such limitation is intended, and the configurations described in the embodiments can also be applied to other tires in a discretionary manner within the scope apparent to one skilled in the art. Examples of other tires include an airless tire, and a solid tire.

Example 1

FIGS. 13 and 14 are tables showing the results of performance tests of tires according to embodiments of the technology.

In the performance tests, a plurality of types of test tires were evaluated in terms of (1) snow traction performance and (2) wear resistance performance. Further, test tires having a tire size of LT265/70R17 121Q were mounted on rims having a rim size of 17×8J, and an internal pressure of 450 kPa and a load specified by JATMA were applied to the test tires. Further, the test tires were mounted on all wheels of an LT pickup car serving as a test vehicle.

a. In the evaluation related to snow traction performance, the test vehicle is driven on a snowy road surface of a snowy road test site and the travel time until the travel speed reaches 20 km/h from 5 km/h is measured. Then, the results are expressed as index values and evaluated, with Comparative Example being assigned as the reference (100). In this evaluation, larger values are preferable.
b. In the evaluation of wear resistance performance, after the test vehicle had been driven for 8000 km on a predetermined off-road course, the difference in the amount of wear between the shoulder land portion 31 and the center land portion 32 was measured and evaluated. The results are expressed as index values and evaluated, with Comparative Example being assigned as the reference (100), and larger values are preferable since the difference in the amount of wear is small. Moreover, if the evaluation is 98 or higher, it is deemed that the performance is properly ensured.

The test tires of Examples 1 to 27 include the configuration of FIGS. 1 to 3, and the shoulder blocks 312A, 312B include the shoulder narrow groove 313 and the first and second branch portions 3141, 3142 defined and formed by the shoulder narrow groove 313. Additionally, the edge portion 3141*e* of the first branch portion 3141 is connected to the tire ground contact edge T, and the edge portion 3142*e* of the second branch portion 3142 is separated from the tire ground contact edge T. A tire cross-sectional height SH (see FIG. 1) is 183 mm and the tire ground contact width TW (see FIG. 2) is 215 mm. Further, the groove width W11 of the shoulder lug grooves 311A, 311B (see FIG. 3) is 17.4 mm, and the groove depth H11 (see FIG. 5) is 14.6 mm. Additionally, in FIG. 3, the circumferential length L12 of the shoulder blocks 312A, 312B is 37 mm, and the widths W12A, W12B are 66 mm and 62 mm.

The test tire of Comparative Example 1 has the same configuration as the test tire of Example 1 except that both edge portions 3141*e*, 3142*e* on the outer side in the tire width direction of the first and second branch portions 3141, 3142 connect to the tire ground contact edge T.

As can be seen from the test results, the test tires of Examples provide both the snow traction performance and wear resistance performance of the tire in a compatible manner.

Example 2

FIGS. 15 and 16 are tables showing the results of performance tests of tires according to embodiments of the technology. FIG. 17 is an explanatory diagram illustrating the test tire of Comparative Example 2.

In the performance tests, a plurality of types of test tires were evaluated in terms of (1) snow traction performance and (2) wear resistance performance described above. Further, test tires having a tire size of LT265/70R17 121Q were mounted on rims having a rim size of 17×8J, and an internal pressure of 450 kPa and a load specified by JATMA were applied to the test tires. Further, the test tires were mounted on all wheels of an LT pickup car serving as a test vehicle.

The test tires of Examples 28 to 46 include the configuration of FIGS. 1, 8 and 9, and the first and second shoulder blocks 312A, 312B each include the shoulder narrow groove 313 and a pair of branch portions 3141, 3142 defined and formed by the shoulder narrow groove 313. Additionally, a pair of edge portions 3141*e*, 3142*e* of the first shoulder block 312A is separated from the tire ground contact edge T, and the edge portions 3141*e*, 3142*e* of the second shoulder block 312B are connected to the tire ground contact edge T. A tire cross-sectional height SH (see FIG. 1) is 183 mm and the tire ground contact width TW (see FIG. 8) is 215 mm. Further, the first shoulder block 312A includes a pair of notch portions 315, 315 connecting a pair of edge portions 3141*e*, 3142*e* and the buttress portion, and these notch portions 315 have step-shaped wall surfaces (see FIG. 12). Further, the groove width W11 of the shoulder lug grooves 311A, 311B (see FIG. 9) is 17.4 mm, and the groove depth H11 (see FIG. 11) is 14.6 mm. Additionally, in FIG. 9, the circumferential length L12 of the shoulder blocks 312A, 312B is 37 mm, and the widths W12A, W12B are 62 mm.

The test tire of Comparative Example 2 has the same configuration as the test tire of Example 28 except that the notch portion 315 of the first shoulder block 312A has the L-shaped cross-section as illustrated in FIG. 17, and does not have a step shape having the road contact surface and the trailing surface.

As can be seen from the test results, the test tires of Examples provide both the snow traction performance and wear resistance performance of the tire in a compatible manner.

The invention claimed is:

1. A tire, comprising:

a plurality of circumferential main grooves extending in a tire circumferential direction; and a pair of shoulder land portions and one or more rows of center land portions defined by the plurality of circumferential main grooves, at least one of the pair of shoulder land portions comprising a plurality of shoulder lug grooves and a plurality of shoulder blocks defined and formed by the plurality of shoulder lug grooves, at least a part of the plurality of shoulder blocks comprising a notch portion that connects an edge portion separated from a tire ground contact edge and a buttress portion, and the notch portion having a wall surface with a step shape in a cross-sectional view in a tire meridian direction, wherein the step shape of the notch portion is formed by alternately connecting two or more road contact surfaces and two or more trailing surfaces in a range of 70 degrees or more and 110 degrees or less, the shoulder blocks each comprise a shoulder narrow groove that terminates inside the shoulder blocks at one end and opens to the tire ground contact edge at an other end, and a pair of branch portions defined and formed by the shoulder narrow groove, at least one of the pair of branch portions comprises the notch portion that connects the edge portion separated from the tire ground contact edge and the buttress portion, the notch portion extends beyond the tire ground contact edge in a tire width direction, a radially outermost road contact surface among the two or more road contact surfaces of the step shape of the notch portion is defined as a first road contact surface, and at least a portion of the first road contact surface is located inward of the tire ground contact edge in the tire width direction, and a maximum depth Hc of the notch portion is in a range $0.70 \leq Hc/H13 \leq 1.20$ with respect to a maximum depth H13 of the shoulder narrow groove, and the maximum depth H13 of the shoulder narrow groove is in a range $0.45 \leq H13/H11 \leq 0.95$ with respect to a groove depth H11 of the shoulder lug groove.

2. The tire according to claim 1, wherein the maximum depth Hc of the notch portion is in a range $0.65 \leq Hc/H11 \leq 0.95$ with respect to the groove depth H11 of the shoulder lug grooves.

3. The tire according to claim 1, wherein a distance Hc' from a tread contact surface to the first road contact surface is in a range $0.20 \leq Hc'/Hc \leq 0.50$ with respect to the maximum depth Hc of the notch portion.

4. The tire according to claim 1, wherein a width Wc' of the first road contact surface is in a range $0.40 \leq Wc'/D2 \leq 0.70$ with respect to a distance D2 from the tire ground contact edge to the edge portion.

5. The tire according to claim 1, wherein a groove width W13 of the shoulder narrow groove is in a range $0.05 \leq W13/W11 \leq 0.50$ with respect to a groove width W11 of one of the shoulder lug grooves.

6. The tire according to claim 1, wherein an extension length L13 of the shoulder narrow groove in the tire width direction is in a range $0.40 \leq L13/W12 \leq 0.80$ with respect to a width W12 of one of the shoulder blocks.

7. The tire according to claim 1, wherein the maximum depth Hc of the notch portion is deeper than the maximum depth H13 of the shoulder narrow groove.

8. The tire according to claim 1, wherein a distance D2 from the edge portion of the shoulder blocks to the tire ground contact edge is in a range $0.05 \leq D2/W12 \leq 0.30$ with respect to a width W12 of the shoulder blocks.

9. The tire according to claim 8, wherein a region Rc surrounded by a tread profile, a profile of the buttress portion, and the wall surface of the notch portion is defined in a cross-sectional view in the tire meridian direction, and an area SRc of the region Rc has a relationship 1.00 mm≤SRc/H11≤7.00 mm with respect to a groove depth H11 of the shoulder lug grooves.

10. The tire according to claim 1, wherein the plurality of shoulder blocks comprise a first shoulder block separated from the tire ground contact edge and a second shoulder block connected to the tire ground contact edge, and each of the pair of branch portions of the first shoulder block comprises the notch portion.

11. The tire according to claim 10, wherein a width W12A of the first shoulder block is in a range 0.90≤W12A/W12B≤1.10 with respect to a width W12B of the second shoulder block.

12. A tire, comprising:

a plurality of circumferential main grooves extending in a tire circumferential direction; and a pair of shoulder land portions and one or more rows of center land portions defined by the plurality of circumferential main grooves, at least one of the pair of shoulder land portions comprising a plurality of shoulder lug grooves and a plurality of shoulder blocks defined and formed by the plurality of shoulder lug grooves, at least a part of the plurality of shoulder blocks comprising a notch portion that connects an edge portion separated from a tire ground contact edge and a buttress portion, and the notch portion having a wall surface with a step shape in a cross-sectional view in a tire meridian direction, wherein the step shape of the notch portion is formed by alternately connecting two or more road contact surfaces and two or more trailing surfaces in a range of 70 degrees or more and 110 degrees or less, the shoulder blocks each comprise a shoulder narrow groove that terminates inside the shoulder blocks at one end and opens to the tire ground contact edge at an other end, and a pair of branch portions defined and formed by the shoulder narrow groove, at least one of the pair of branch portions comprises the notch portion, a road contact surface on an outermost side in a radial direction of the two or more road contact surfaces having the step shape is defined as a first road contact surface, and a width Wc' of the first road contact surface is in a range 0.55≤Wc'/D2≤0.70 with respect to a distance D2 from the tire ground contact edge to the edge portion.

* * * * *